United States Patent [19]
Weber et al.

[11] Patent Number: 5,572,651
[45] Date of Patent: Nov. 5, 1996

[54] TABLE-BASED USER INTERFACE FOR RETRIEVING AND MANIPULATING INDICES BETWEEN DATA STRUCTURES

[75] Inventors: Karon A. Weber, San Francisco; Alex D. Poon, Mountain View; Thomas P. Moran, Palo Alto, all of Calif.

[73] Assignee: Xerox Corporation, Stamford, Conn.

[21] Appl. No.: 138,817

[22] Filed: Oct. 15, 1993

[51] Int. Cl.$^6$ .................................................. G06F 3/14
[52] U.S. Cl. ........................................................... 395/155
[58] Field of Search ................................... 395/161, 100, 395/160; 360/22; 364/578

[56] References Cited

U.S. PATENT DOCUMENTS

| | | | |
|---|---|---|---|
| 4,112,415 | 9/1978 | Hilbrink | 395/100 |
| 4,577,240 | 3/1986 | Hedberg et al. | 360/22 |
| 4,724,495 | 2/1988 | Hedberg et al. | 360/22 |
| 4,808,987 | 2/1989 | Takeda et al. | 340/721 |
| 4,841,387 | 6/1989 | Rindfuss | 360/72.1 |
| 4,928,247 | 5/1990 | Doyle et al. | 395/160 |
| 5,012,334 | 4/1991 | Etra | 358/102 |
| 5,097,411 | 3/1992 | Doyle et al. | 395/100 |
| 5,121,470 | 6/1992 | Trautman | 395/140 |
| 5,307,295 | 4/1994 | Taylor et al. | 364/578 |

FOREIGN PATENT DOCUMENTS

| | | |
|---|---|---|
| 495612A2 | 7/1992 | European Pat. Off. ........ G06F 15/02 |
| 3446593A1 | 7/1985 | Germany . |
| 63-079178 | 4/1988 | Japan . |

OTHER PUBLICATIONS

Hardock, G. Design Issues For Line–Driven Text Editing/Annotation Systems. Graphics Interface, Jun. 3, 1991, Toronto, Canada. pp. 77–84.

Mezic, D. Pen Computing Catches On. Byte, col. 18, No. 11, Oct. 1993, St. Peterborough, U.S.A. pp. 105–112.

Search Report from EPO, Dec. 23, 1994.

Aguierre Smith, T. G. and Davenport, G. "The Stratification System A Design Environment for Random Access Video." *Proceedings of the 3rd International Workshop on Network and Operating System Support for Digital Audio and Video*, San Diego, California, Nov. 1992.

Davis, M. E., "Director's Workshop: Semantic Viceo Logging with Intelligent Icons," Position Paper for *AAA1–91 Intelligent Multimedia Interfaces Workshop*, 1991, pp. (1)–(11).

(List continued on next page.)

*Primary Examiner*—Mark R. Powell
*Assistant Examiner*—Ruay Lian Ho
*Attorney, Agent, or Firm*—R. Christine Jacobs

[57] ABSTRACT

A user-interactive method for use in a processor controlled machine provides a user with the capability to retrieve and manipulate associations previously established among image segments in a single or in multiple data structures, where the image segments are stored as image data and not as recognized or interpreted information. The use of certain designated image segments, called key objects, for association with one or more other stored image segments in effect imposes a user-defined categorization structure on the image segments with which key objects are associated, producing groups of image segments associated with respective key object. The categorized information for a particular key object is retrievable and displayable with the key object image, also without performing a recognition operation, providing an indexing mechanism into the image data. Multiple groupings of categorized information may be presented in a tabular format, showing the relationship between key objects and image segments, and the tabular presentation may be used as a user interface for the post-creation manipulation and alteration of key object associations in order to further refine or extend the categorization structure. The invention is particularly useful in systems that provide for a stylus- or pen-based computing interface, since it provides a powerful mechanism for manipulating relationships that are semantically significant to a user between handwritten symbols represented as images without the need to perform a recognition operation on the images.

8 Claims, 29 Drawing Sheets

OTHER PUBLICATIONS

"Indexing Transcripts: New Versions of Old Friends," *The Recorder*, San Francisco, CA, Sep. 29, 1993, pp. 12–13.

"New hope for Pen Computing", *San Francisco Examiner*, San Francisco, CA, Jun. 13, 1993, p. E1.

"New Software for Hand–Held PCs", *San Francisco Chronicle*, San Francisco, CA, Jun. 14, 1993, p. C2.

"Software helps pen PCs", *San Jose Mercury News*, San Jose CA, Jun. 15, 1993 (page unknown).

Key Object Data Structure —62

| Key Object Data | Identifier | Other Key Object Data |
|---|---|---|
| Key Object Data | Identifier | Other Key Object Data |
| ⋮ | ⋮ | ⋮ |

64, 66, 68

Data Object Data Structure —70

| Data Object Information | Identifier(s) |
|---|---|
| Data Object Information | Identifier(s) |
| ⋮ | ⋮ |

TABLE-BASED USER INTERFACE FOR RETRIEVING AND MANIPULATING INDICES BETWEEN DATA STRUCTURES

CROSS REFERENCE TO OTHER APPLICATIONS

The present invention is directly related to an invention that is the subject matter of a concurrently filed, commonly assigned U.S. patent application having the following serial number and title: Ser. No. 08/138,548, "Method for Creating Computationally-Significant Associations Among Uninterpreted Data in Graphically-Based Computing Systems," and Ser. No. 08/138,545, "Interactive Method and System For Producing Address-Correlated Information Using User-Specified Address Zones," both of which are hereby incorporated by reference herein. Other commonly assigned U.S. patent applications having subject matter related to the present invention include concurrently filed Ser. No. 08/138,549, "Interactive System for Producing, Storing and Retrieving Information Correlated with a Recording of an Event," and currently pending Ser. No. 07/819,211, entitled "Indexing of Data Sets," and currently pending Ser. No. 07/819,258, entitled "A Data Access System."

FIELD OF THE INVENTION

The present invention relates to a method for identifying and retrieving computationally significant relationships between data objects in a graphical input system. More particularly, the present invention relates to a method for retrieving and changing computationally retrievable associations between non-computationally distinguished objects, using non-computationally distinguished objects.

BACKGROUND OF THE INVENTION

Graphically-based computer systems, for example mouse or pen-based computer systems, input data in a state that is visually distinguishable by the user of the input device. These same graphical input data, however, are often not distinguishable by the computer. Elaborate methods to recognize handwriting have been developed to attempt to overcome this problem.

The process of creating computationally distinguishable associations in material in graphically-based systems without computationally recognizing the material has been very difficult. The material may be of any sort: images, text, graphics, or recorded material. It is desirable to apply category indices to portions of material to label them for later retrieval of relevant portions. Prior methods of annotating or categorizing material in real time using computationally recognizable indices may require the user to either 1) click on and off a preset list of categorizers, 2) attempt to type real-time notes to take advantage of the system's ability to computationally recognize typed text, or 3) manually correlate notes, adding computationally significant markers, at a later time. In all of these cases, users are forced to comply with the computational limitations of the system rather than have a technique which adapts to their natural method of notetaking. In order to make material more accessible, users require a facile method for creating a set of personally structured annotations. and retrieving annotations without undue computational effort.

Other proposed methods for categorizing material for later retrieval provide pre-defined index categories, with some kind of menu or palette of these pre-defined indices provided to the user, along with some kind of technique for attaching the indices to the portions. For example, the indices can be arrayed in a button panel alongside a window displaying the "current" portion of material; and indices could be attached to the current portion by "touching" relevant buttons.

A problem with this method is that pre-defined categories are not usually sufficient. The user will want to create categories to better characterize the material at hand, and "ad hoc" categories will emerge during the process of examining the materials. It is possible to have the user create ad hoc categories by typing in names for them.

Giving users sets of pre-made categorizers to apply to the material may force the users to operate sets of buttons or invoke commands while at the same time trying to digest the content information, figure out which category it belongs to, as well as take notes. The button method also requires that the user remember to deactivate a button, as failure to do so provides a false structure to the categorization.

Computer systems may be used for notetaking during events, which may also be recorded simultaneously, or pre-recorded. Text-based systems using keyboards may be used in these instances, but since most people talk much faster than they type, creating computer generated textual labels to describe the content in real time requires enormous effort. Additionally, the click noises of the key strokes may be distracting to the user or others present, and may contaminate audio tracks of recordings made of real time events. To aid in solving some of these problems, pen-based systems have been applied.

In pen-based notetaking and recording systems, locating interesting parts of a recorded media may be assisted by a correlation between the notes and the time base of the recording. For example, Lamming, EP-0 495 612 describes a notetaking system based on a notepad-size computer with a graphical input device. Each stroke and character input by the user is given a time stamp. When a stroke or character is later selected, the recorded media correlated to the time stamp of that particular object is retrieved. By entering new, separate marks near a previously entered indicium whenever an idea or speaker or topic applies to the previously entered indicia, later selection of all of the marks spatially associated with that indicia will result in all sections of the recording indexed by the time stamps of the respective marks to be replayed.

Rindfuss, U.S. Pat. No. 4,841,387 presents a pen-based system for recording and indexing information, in which the positions of handwritten notes are stored in a correlation table correlated with the position of the recording medium. When a portion of the handwritten notes is later identified, the system uses the correlation table to locate the corresponding portion of the recorded information.

In the pen-based computer and recording systems above, the computer must correlate the time a particular pen mark is made with the portion of the recording made at that time. In graphically-based systems, where there is no recording made or available, these time-based marks may have little information that is inherently useful for categorizing relationships in the graphical information without a pre-thought-out plan provided by the user. The user's ability to index notes is entirely controlled through the time stamps of the indicia the user has entered in a document. In the case of Lamming, this time-stamping does not allow for later, real-time augmentation of previously entered notes while the event continues, with additional notes or categorizations related to previously entered notes added in real time as the event is taking place, since later notes will be time-stamped with the time they were entered rather than with the time of the material to which they relate.

With respect to a document not related to a recorded event, and that contains text or graphics, a user may wish to indicate or retrieve relationships in different parts of a document. However, without sophisticated handwriting recognition programs, or a related keyboard system, most forms of annotation in pen-based systems are not computationally recognizable to the computer.

All that is actually needed in a graphically-based system, however, are visually distinguishable icons which allow the user to tell one from another and to remind the user of what the icon means. These icons may be applied to different portions of data structures to establish a relationship between the portions, and may be used to retrieve associated data objects based on the relationships. The computer system need only be able to computationally distinguish between one icon and another, without necessarily distinguishing the meaning of the icon. The computer may then distinguish and present a computationally significant relationship between objects tagged with the same icon.

It is an object of the present invention to provide a rapid and facile method for defining categorical objects and using them to denote categorization of other objects in a graphically-based computer system. This object is obtained by allowing the user to create visible icons which are assigned unique identifiers when they are created. The visual icons are used as a reference to attach the distinguishable identifiers to other data objects, establishing computationally significant relationships between the visible icons and the data objects, and between data objects with similar identifier attachments.

It is a further object of the invention to provide a rapid and facile method for manipulating categorical information about uninterpreted data objects in a graphically-based computer system. This object is obtained by providing visual representations of the associations between selected data objects and categorizational objects, and providing an ability to change the associations based on graphical representation data.

SUMMARY OF THE INVENTION

The method and system of the present invention provide a flexible method for retrieving computationally-significant categorization information in graphical input systems with information data comprising non-computationally significant visual information.

In accordance with the present invention, a data structure is obtained which comprises uninterpreted key objects, each assigned a machine recognizable identifier. A further data object data structure is obtained which comprises uninterpreted data objects that may have associated with them machine recognizable identifiers assigned to key objects. In order to extract categorical information, a key object representing the category may be selected, and data objects which have associated with them the identifier assigned to that key object determined.

In a further aspect of the invention, output data expressing the associative relationship between key objects and data objects may be provided by providing images representative of key objects and images representative of data objects provided to a display so that data objects which are associated with the identifier of a key object are positioned so as to be perceived as being associated with the key object.

In accordance with another aspect of the invention, the associative data may be presented in a tabular format, in which each cell in the table indicates the relationship between a particular key object and a particular data object. Associations may be altered through selection of cells common to the particular objects, the key object identifier of the key object indicated by a particular cell being placed in the data object data structure with the data object indicated by the particular cell.

An important feature of the present invention is the ability to retrieve user-produced information with special information designators called key objects which are used as access mechanisms into the user-produced data, without recognition or interpretation of the data. A key object itself may be comprised of uninterpreted, unrecognized data. This novel implementation both in the user interface and data structure of the present invention provides a flexible and powerful categorical retrieval tool into graphical information, without requiring the use of expensive or sophisticated recognition algorithms.

BRIEF DESCRIPTION OF THE DRAWINGS

FIG. 5 shows a example data structures used by the present invention to store key object data and identifiers and data object information and associated identifiers.

DETAILED DESCRIPTION

Figure 1:
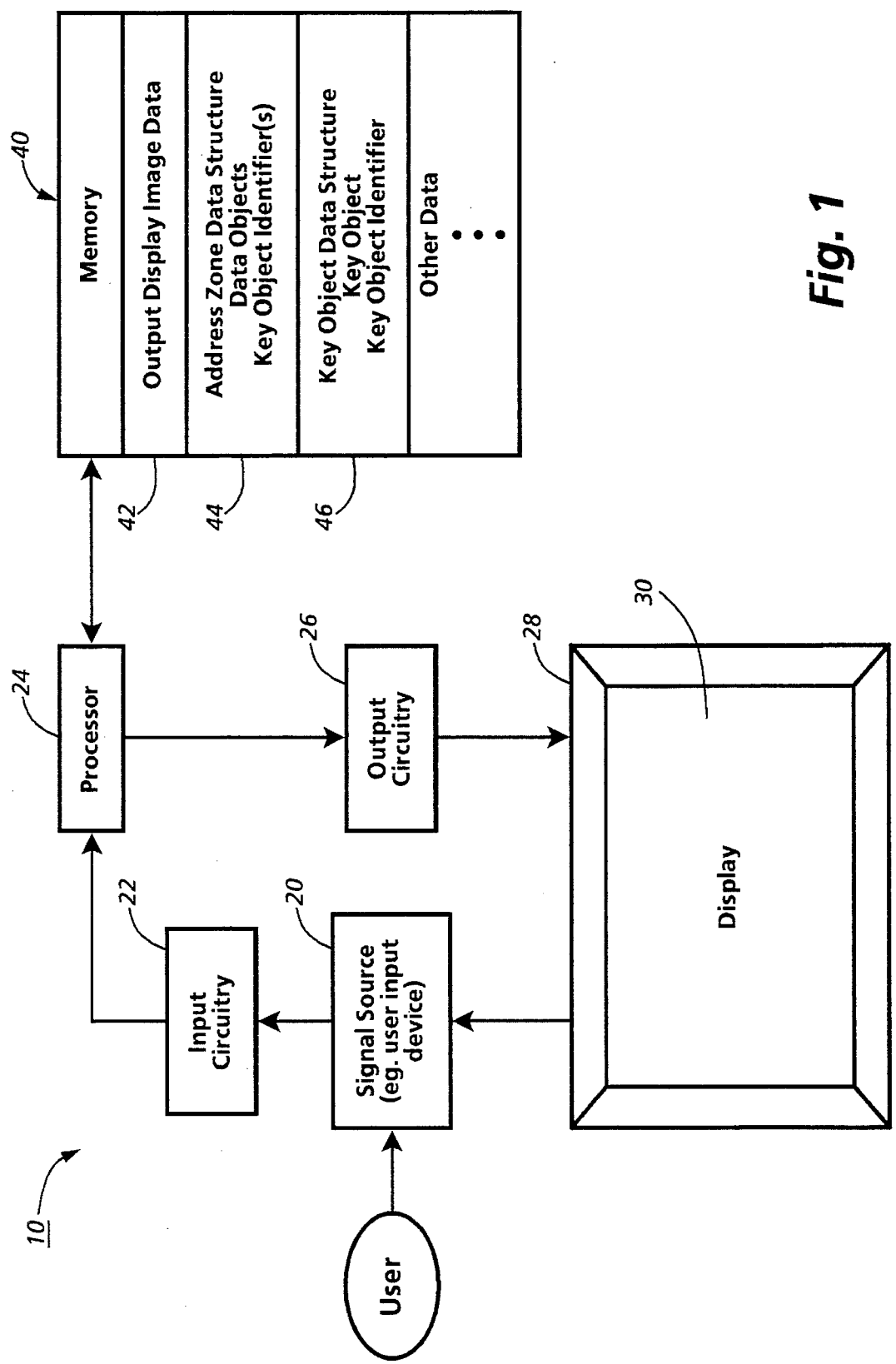
FIG. 1 shows a general purpose processor-controlled machine operated by the present invention.

A. Conceptual Framework, Definitions and Machine Environments

The present invention relates to method steps for operating a machine including a processor, and to processing electrical or other physical signals to produce other desired physical signals. The detailed descriptions which follow are presented largely in terms of display images and symbolic representations of operations of data within the memory of the display system. These descriptions and representations, which are algorithmic in nature, are the techniques used by those skilled in the data processing arts to most effectively convey the substance of their work to others skilled in the art. An algorithm is here, and generally, conceived to be a self-consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities.

Further, the manipulations performed are often referred to in terms, such as "adding," "comparing," or "determining," which are commonly associated with mental operations performed by a human user. Apart from supplying certain signals to the machine or system that the method operates, the capability of a human user is neither necessary nor desirable in the operations described herein which form part of the present invention. In addition, the algorithmic descriptions presented herein of the acts of the present invention for operating a system are not inherently related to any particular processor, machine, or other apparatus. Useful machines for performing the operations of the present invention include general purpose digital computers or other similar devices configured as described below and in the claims.

The present invention also relates to a machine and system for performing these operations. This machine or system may be specially constructed for the required purposes or it may comprise a general purpose computer selectively activated or reconfigured by a computer program stored in the computer. In particular, various general purpose machines may be used with programs in accordance with the teachings herein, or it may prove more convenient to construct a more specialized apparatus to perform the required acts of the method. The required structure for a variety of these machines will appear from the description given below.

1. Definitions

Preliminary to describing the embodiments of the claimed invention illustrated in the accompanying drawings, the terms defined below have the meanings indicated throughout this specification and in the claims.

The term "data" refers herein to physical signals that indicate or include information. The term "data" includes data existing in any physical form, and includes data that are transitory or are being stored or transmitted. For example, data could exist as electromagnetic or other transmitted signals, or as signals stored in electronic, magnetic, or other form.

An "item of data" or a "data item" is a quantity of data that a processor can access or otherwise operate on as a unit. For example, an eight-bit byte is a data item in many data processing systems. Data can be combined into a "data structure." A "data structure" is any combination of interrelated data. A data structure may also include other data structures.

A "processor-controlled machine" or "processor" is any machine, component or system that can process data, and may include one or more central processing units or other processing components. Any two components of a machine or system are "connected" when there is a combination of circuitry that can transfer data from one of the components to the other. The component from which the data is transferred "provides" the data, and the other component "receives" the data. For example, two processing units are "connected" by any combination of connections between them that permits transfer of data from one of the processing units to the other. A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor "uses" data in performing an operation when the result of the operation depends on the value of the data. An "instruction" is an item of data that a processor can use to determine its own operation. A processor "executes" a set of instructions when it uses the instructions to determine its operations.

"Memory" is any component, combination of components, circuitry, or system that can store data, and may include local and remote memory and input/output devices. An example of memory is a storage medium access device with a data storage medium that it can access.

A "data storage medium" or "storage medium" is a physical medium that can store data. Examples of data storage media include magnetic media such as floppy disks and PCMCIA memory cards, optical media such as CD- ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An item of data "indicates" a thing, an event, or a characteristic when the item has a value that depends on the existence or occurrence of the thing, event, or characteristic, or on a measure of the thing, event, or characteristic. When an item of data can indicate one of a number of possible alternatives, the item of data has one of a number of "values." In addition, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when a first item of data indicates position information of an image display feature in the display area of a display device, and the position information may be used by the processor to obtain a second data item in a data structure, the first item of data indicates the second item of data. In another example, within a data structure, when a first item of data includes a pointer or other information related to the location of a second item of data in the data structure, the first item of data indicates the second item of data.

An "image" is a pattern of light. An image may include characters, words, and text as well as other features such as graphics. An image may be divided into image "segments," each of which is itself an image. A segment of an image may be of any size up to and including the whole image. An "image output device" is a device that can provide output defining an image. A "display" or "display device" is an image output device that provides information in a visible, human viewable form. A display may, for example, include a cathode ray tube; an array of light emitting, reflecting, or absorbing elements; a device or structure that presents marks on paper or another medium; or any other device or structure capable of defining an image in a visible form. To "present an image" on a display is to operate the display so that a viewer can perceive the image. A "display area" is the portion of the display in which an image is presented or the medium which receives an image.

Data "defines" an image when the data includes sufficient information to directly produce the image, such as by presenting the image on a display. Data defining an image will also be referred to herein as an "image definition" or "image definition data." For example, a two-dimensional array is an image definition that can define all or any part of an image, with each item of data in the array providing a value indicating the color of a respective location of the image. Each such image location is typically called a "pixel," and the two-dimensional array of data is typically called "image pixel data" or an "image pixel data structure," and each item of data in the array providing a value, called a "pixel value," indicating the color of an image location. While image pixel data is the most common type of image definition data, other image definitions, such as vector list data, are intended to be included within the meaning of data defining an image.

The term "display feature" refers to any human perception produced by a display in a processor-controlled machine or display system. A "display object" is a display feature that is perceptible as a coherent unity. A display object "includes" a display feature if presentation of the display object can produce perception of the display feature. A "shape" is a display object that has a distinguishable outline; for example, a circular display object is a shape. A shape having a bounded area may be called a "region." An image "includes" a display feature or object if presentation of the image can produce perception of the feature or object. For example, a first image "includes" a display feature representing the time when the machine user can perceive the time from the display feature presented.

A "workspace" as used herein is a display region within which other display features appear to have respective relative positions, and "presenting" a workspace that includes plural display features produces the human perceptions of the display features in respective positions relative to each other. A window is an example of a workspace.

A common characteristic of processor-controlled machines and display systems operated by the method of the present invention is a mapping between items of data within the system and display features included in images presented by the system. A display feature "represents" a body of data when the display feature can be mapped to one or more items of data in the body of data, or, stated in another way, a display feature "represents" the item or items of data to which it can be mapped. For example, the display feature perceived as the time in an image may represent one or more items of data in a data structure that have a value or values indicating the time.

The mapping of one or more items of data to a display feature or object is performed by an "operation" which is used herein to mean a set of instructions (instruction data items) accessible and executable by the processor in a display system, defining the mapping relationship or function between one or more items of data (an input of the operation) and a display feature or object in an image (an output of the operation). An operation "produces" an object or display feature in an image when the operation begins without the data defining the object or display feature in the image, and performing the operation results in the data defining the object or display feature in the image. When the operation uses items of data as input to produce data defining an object or a display feature in an image, the object or display feature is "produced from" those input data items. An operation "modifies" an item of data that has one of a number of values when it changes the data item to a data item that has a different value.

An object or operation is considered "significant" if it has a particular meaning to a user or device. A "computationally-significant" item may be computed, recognized, or manipulated by a processor. Thus, data representing interpreted text, mathematical values, or a computer-manipulable data structure is "computationally-significant."

The method of the present invention permits a system user to interactively produce stored information that is correlated with an "address". As noted earlier, the "address" refers to a measurement dimension used to identify a portion of the stored information. When the stored information is being correlated with recorded signals, the address typically refers to the location of the recorded signals on the storage medium storing the recorded signals. However, the method and system of the present invention are not limited to correlating information with recorded signals, and may be used in any situation where later access to the stored information would be facilitated by correlation with an address, and by having an access mechanism as provided by the "information designators", described in more detail below. Generally, but not exclusively, when the system user is producing stored information related to a linear "event" occurring sequentially in time, the address used in the correlation of the stored information with the event will be that of time. Any other suitable dimension, measurement, or address may be used for the particular situation.

The stored information produced interactively by the system user of the method and system of the present invention may be about an "event" that the user is perceiving. The user will be able to correlate the stored information to the event's real time, as measured by a clock connected for providing time data to the system, or to some other dimension or measurement of the event. An "event" as used herein is any series of stimuli perceivable by a human. The stimuli may include visual, auditory, tactile, or olfactory stimuli, and they may originate from a human or machine source. For example, the event may be a live concert, or the playing of an audio recording on a tape or compact disk player. The event may also be a business meeting, the reading of a document, or a computer-based animation being executed on a computer. The event may also be a movie or television program, or a medical operation, or a legal deposition, or a fire, or a presidential speech, or a town meeting. It is even contemplated that in some situations, the method of the present invention may be useful for recording information about the user's memory of an event.

The term "zone" is used to mean a spatial region on the display that is distinguished from adjacent parts of the display by a distinctive display feature. The zone is perceivable to the system user as a single unit that is associated with a single address (e.g., time), and may be referred to variously herein as a "time zone," a "data zone," a "spatial region," and "address data zone," or an "address zone." An "address zone data structure" is the collection of data items in memory that is represented by an address zone in the display area, and an address zone data structure indicates a display location, called an "address display location" included in the data structure from which the location of the spatial region in the display area may be computationally derived.

One novel and important feature of the present invention is that the correlation of the address to the stored information is entirely under the control of the system user, and is not subject to the restrictions imposed by a correlation mechanism that automatically correlates a user action with an address. The system user requests a "user-requested address value" from the address source to establish a correlation between the stored information in an address zone data structure represented by a spatial region and an address value. For example, when the address source is a clock source, the user-requested address value is a time value, and the system user determines when to correlate the stored information with a time value.

An "information designator" is a data item that may be created by the system user to establish a correlation between the information in a first address zone with the information in a second address zone so that the system user may retrieve information designator information related to a particular address zone. An information designator is stored in an "information designator data structure." Examples of information designators include, but are not limited to, key words, labels, identifiers, and graphical representations of information. An information designator may also function as a type of index into the address zone data structure, in order to permit a system user to correlate the substance of the information entered into a first address zone with either information entered in other address zones, or with the user-requested address value stored in the address zone data structure represented by the address zone into which the information designator is entered. The extent of the correlation and indexing permitted between the information designator data structure and the address zone data structure is dependent on the particular implementation of the method and system of the present invention. The variety of implementations will be explained in more detail below in the discussion accompanying the data structures. An information designator may also be referred to herein as a "key object", and the information designator data structure may be referred to as a "key object data structure."

The term "stored information" refers to any information the user enters in an address zone, including information designators, for storage in the address zone data structure. Stored information is also referred to herein as "user-produced event data". An example of stored information is commonly and generically referred to as "notes", and a useful implementation of the present invention that may be used in a wide variety of situations is in the form of a method and system for supporting notetaking. Stored information, or notes, may be entered using a variety of conventional user input device or devices. When the user input device is a keyboard or other character generating device, the user-produced event data may be entered as character data. In the illustrated embodiment described below, the user input device is a "stroke inputting device", such as a stylus or other pen-like device, capable of producing "strokes" by interacting with the surface of a display. A "stroke" is defined herein as a list of pixels (picture elements).

An "object" represents a semantic aspect of an application domain (e.g., letters, words, and paragraphs in a word processor; strokes in a drawing or stylus-based system; temporal events and dependencies in a project management system; etc.). An object may be made up of instructions or other data, other objects, or may contain information found in other objects. An object need not be stored as a physical unit in a memory, but must be accessible by the processor as a separate distinguishable entity.

2. The Machine Environment

The method of the present invention operates a variety of processor-controlled machines, each of which has the common components, characteristics, and configuration of machine 10 illustrated in FIG. 1. Machine 10 includes input circuitry 22 for receiving input "request" signals from one or more signal sources or user input devices 20 indicating image display requests. An image display request may include a request for an operation and information identifying the requested operation, wherein the signal or signals indicate one or more actions by a machine user intended to cause performance of the operation. An operation is performed by the machine "in response" to a request when the signals received are for indicating a valid request for a valid operation and for causing the operation to be performed. Signals indicating a single complete request may include a combination of any number of actions indicated by the user necessary for indicating a valid request for a valid operation and for causing the operation to be performed. Signals indicating user actions may also include signals indicating the selection or movement of a display object visible to the user in display area 30, signals indicating requests that result in operations being performed by processor 24, and signals that result in processor 24 providing data defining an image to output circuitry 26 for display in display area 30.

Signal source 20 may include any signal producing source that produces signals of the type needed by the method of the present invention. Such sources include a variety of input devices controllable by a human user that produce signals generated by the user, and may also include other devices connected to machine 10 for providing such signals, including devices connected by wired or wireless communications facilities, such as through remote or local communications networks and infrared and radio connections. Signal source 20 may also include operations performed by machine 10, such as the operating system of a digital computer, or other applications performed by the digital computer.

Signal source 20, connected to input circuitry 22, may include, for example, a keyboard or a pointing device, used by the machine user to indicate actions. Suitable pointing devices include, but are not limited to, a mouse, a stylus or pen, and a trackball. The pointing device has circuitry (not shown) for controlling the interaction between the machine user and display features and objects presented on display device 28. For example, the pointing device may have buttons (not shown) which when clicked or released result in signals being sent through input circuitry 22. In addition, signal source 20 may be a pen-like or stylus device that can be moved over the display surface display area 30. In the case of a pen-like or stylus device, there may be a pressure sensitive tip switch (not shown) which results in signals being sent through input circuitry 22 when the user presses the tip switch against display area 30, such as, for example, when the system user uses the stylus to make gestures in display area 30. Alternatively, signal source 20 may be a touch sensitive surface of display device 28, for example, corresponding with display area 30, such that input circuitry 22 is included within display device 28. The method of the present invention may be implemented in a manner to receive signals indicating a display request from any of these signal sources. Processor 24 is connected for receiving the signals from input circuitry 22.

With continued reference to FIG. 1, machine 10 also includes memory 32 for storing data. Processor 24 is connected for accessing the data stored in memory 32, and for providing data for storing in memory 32. Memory 32 stores instruction data indicating instructions the processor executes, including the instruction data indicating the instructions for operating machine 10 according to the method of the present invention.

As noted earlier, with respect to all circuitry components, any two components of circuitry are "connected" when there is a combination of circuitry that can transfer data from one of the components to the other. Processor 24 is connected for providing data defining images to output circuitry 26 for presentation on display 28 in display area 30. In the description below of the illustrated embodiment, the display area corresponds to the visible part of the display screen, and the method of the present invention provides for visibly displaying an image therein. However, the method of the present invention could also provide for displaying images in a virtual screen or presentation space for a window, or to the area of a buffer for printing or facsimile transmission or the like.

The actual manner in which the physical hardware components of machine 10 are connected may vary, and may include hardwired physical connections between some or all of the components, connections over wired or wireless communications facilities, such as through remote or local communications networks, and infrared and radio connections. For example, memory 32 may include memory that is physically connected to processor 24 as local memory, or that is remotely accessible to processor 24 by means of a wired or wireless communications facility. Thus, when it is described below that the method causes processor 24 to access a particular data item, that data item may be stored in a memory device that is remotely located from machine 10 but which is accessible to processor 24 by means of the appropriate connections. It is further of importance to note that the range of the physical size of either machine 10 may vary considerably from a machine that includes a very large display device 28 suitable, for example, for electronic "whiteboard" applications, to a machine that includes much smaller desktop, laptop, and pocket-sized or smaller display devices. The machine may further consist of one or more display devices of varying sizes, all accessible to processor 24 by means of the appropriate connections. It is intended that the method of operating a machine according to the present invention be operable on all display machines and combinations in this physical size range.

One implementation of the method of the present invention has been implemented as a software program on an Apple Macintosh (TM) Model IIfx computer running the System 7 (TM) operating system, available from Apple Computer, Inc., of Cupertino, Calif. The software program is written in a standard version of the C++ programming language in conjunction with the Apple MacApp class library, using a compiler available from Apple. This pen-based embodiment utilizes a Wacom Handwrite Digitizer (HD-648A) and attached stylus for user input, available from Wacom Technology Group, Vancouver, Wash. The Wacom digitizer interfaces with the Macintosh IIfx through a serial line protocol developed by Wacom. It will be apparent to those skilled in the art that a wide variety of programming languages and hardware configurations could readily be used in place of those in the illustrated embodiment based on the description herein without departing from the scope and intended utility of the method of the present invention.

Continuing with FIG. 1, memory 32 includes space for output display image data 34, which provides a display image for display area 30. Output display image data 34 may include image features which represent portions of information data structure 36. Also included is a key object data structure 38, to be discussed in more detail below.

Figure 2:
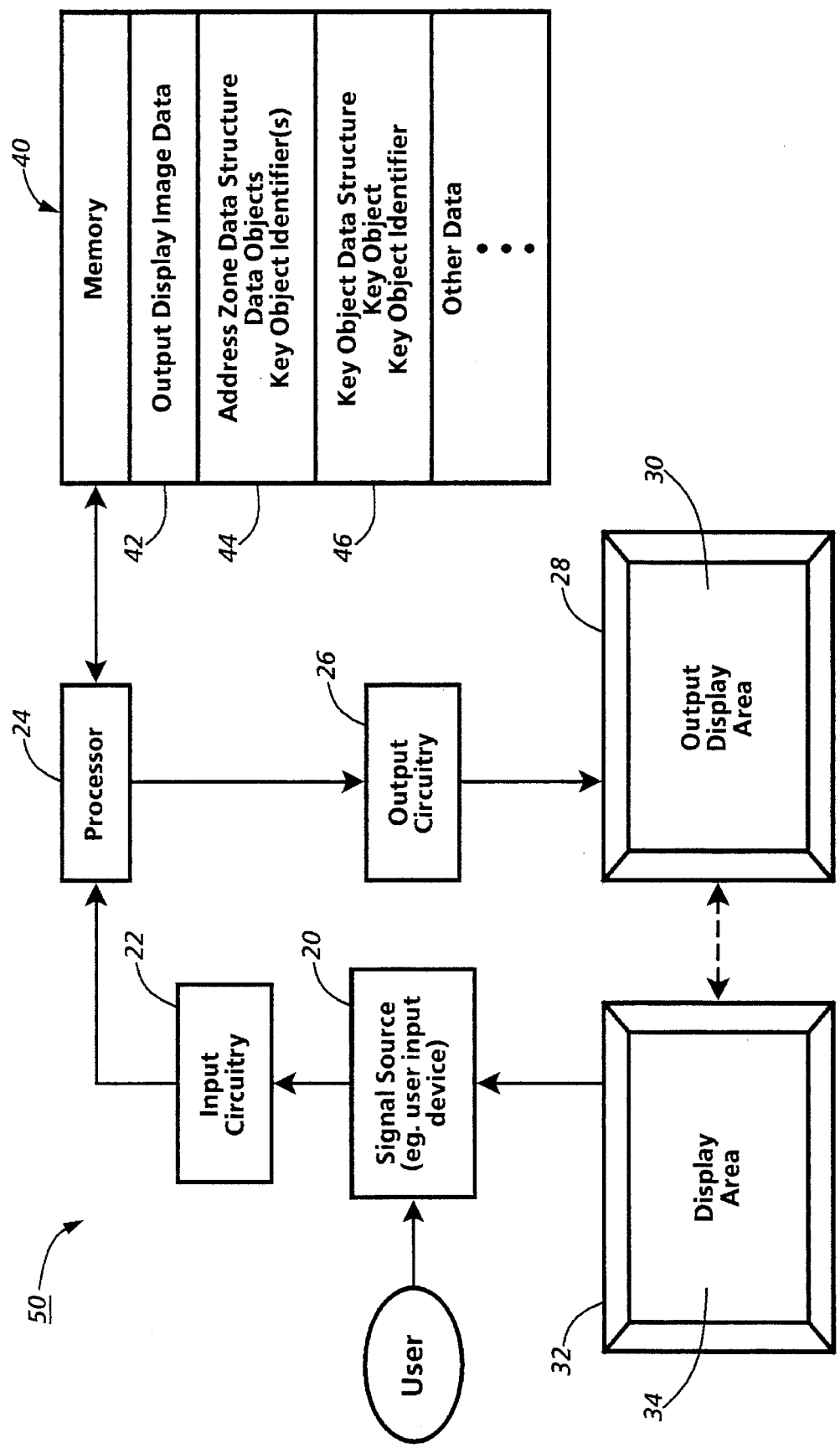
FIG. 2 shows a similar general purpose processor-controlled machine including separate display devices for providing input and output display areas.

FIG. 2 shows a machine 50 similar to machine 10 of FIG. 1. In FIG. 2, the signal source may produce a signal in response to data for a display 32 that may be separate from output display 28. Segments of data displayed in display area 34 may be selected as key objects, which are applied to the data shown in output display area 30.

B. General Description of the Method of the Invention

1. Storing Computationally Significant Information

Figure 3:
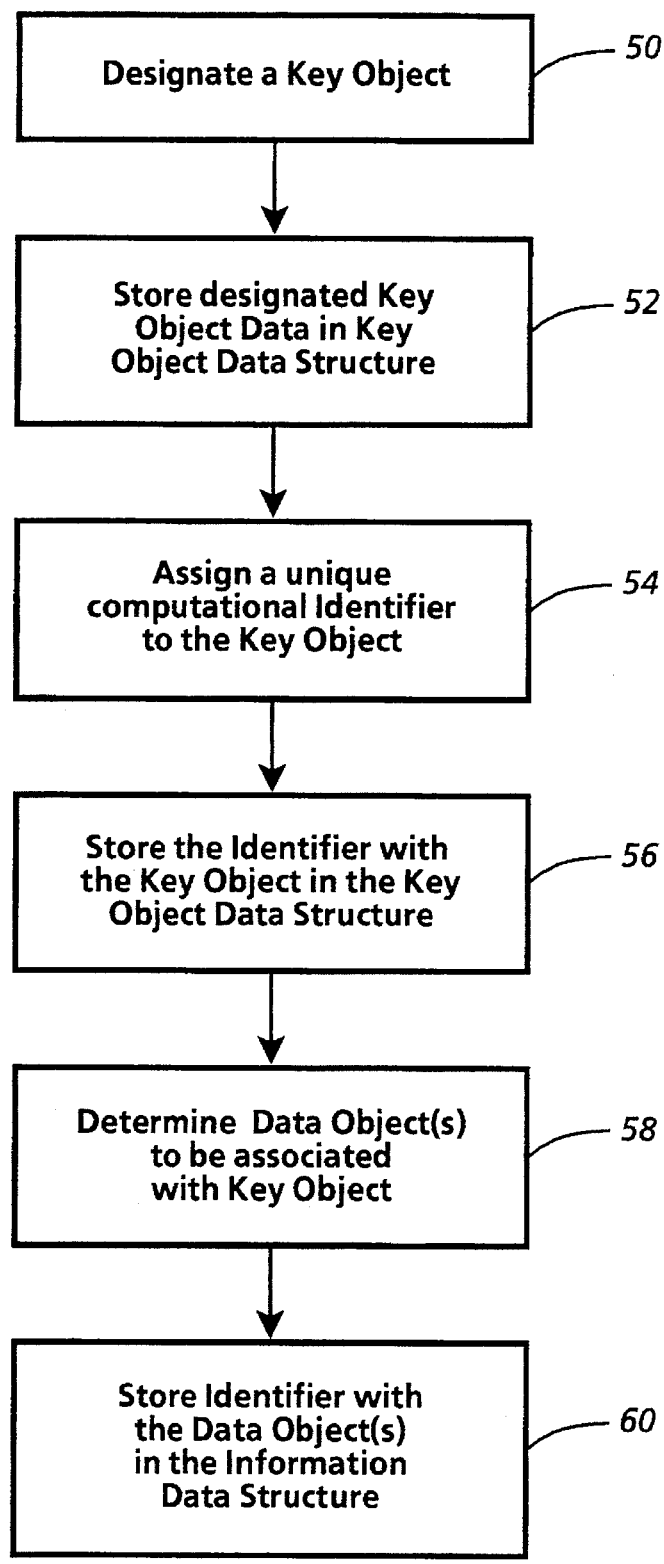
FIG. 3 is a flowchart showing the general method of creating computationally-significant associations in uninterpreted data according to the present invention.

FIG. 3 describes a method of creating computationally-significant relationships in uninterpreted data. The step in box 50 designates a "key object," which may also be known as an "information designator." As will be described below, this may be done in a pen-based system by circling an area on the screen indicating some data area. Clearly, however, other methods for designating particular areas in graphically-based input systems may also be used. The step in box 52 stores the data designated as a key object in a key object data structure 62, shown in FIG. 5. This stored key object data 64 may include the strokes, bitmap, or underlying data structure contained in the area designated, depending upon the implementation. The computer system need not recognize the underlying data itself-the data may be nothing more than symbolic characters, visually useful to the user, but otherwise computationally indistinguishable.

The step in box 54 assigns a unique, computationally recognizable, identifier to the newly created key object. This key object identifier 66 is also stored in the key object data structure 62, along with the key object 64. Any other data to be stored with the key object, for example a display location on the screen or a selection designation, may also be stored as other key object data 68 in the key object data structure 62.

Once the key object has been designated and stored, it maybe applied to other data objects stored in data structure 70, also shown in FIG. 5. The step in box 58 determines a data object to be associated with the key object, and the step in box 60 stores the identifier of that key object in the data structure in an identifier area. Note that more than one identifier may be associated with any data object, and an identifier may be associated with more that one data object. It is not necessary for the method of the invention for each data object to be mutually exclusive, but the computer must be able to distinguish objects to the extent that it can recognize which identifiers go with which data objects.

FIGS. 4–8 show the method described above applied to general applications in a pen-based system 80. Display area 82 contains some writing, which may, for example, have been produced by handwriting with pen 83, by recalling it from the system memory, or by being scanned in. The display area 82 may further contain typed in (machine recognizable) text, or graphics. The display image shown may have been produced by taking notes during a meeting on handwritten documents.

An area 84 has been designated a key object, in this case by circling. The key object 84 is stored in a key object data structure 62. This data structure is stored in memory 46. The key object may remain circled in the display, or may be copied into a special key object display area 85, shown in FIG. 6, which may be part of display 80, or may be part of another display system.

When the key object is assigned a unique identifier 66, a visual representation of it is shown nearby the key object. Key object identifier 66 is also stored in the key object data structure 62, as shown in FIG. 5. Other key object data 68 may also be stored in the key object data structure, including for example, position data or activation status.

In the example shown, key object 84 has been assigned an identifier, shown as ordinal number "1" symbol 86. Other key objects 88 and 92 may also be selected. It may be seen from these examples that key objects do not have to be computationally recognizable data-partial words and even symbols may be used for key objects. Identifier 90, assigned to key object 88, and identifier 94, assigned to key object 92, are computationally recognizable and are used to distinguish between the key objects shown in the example.

Figure 7:
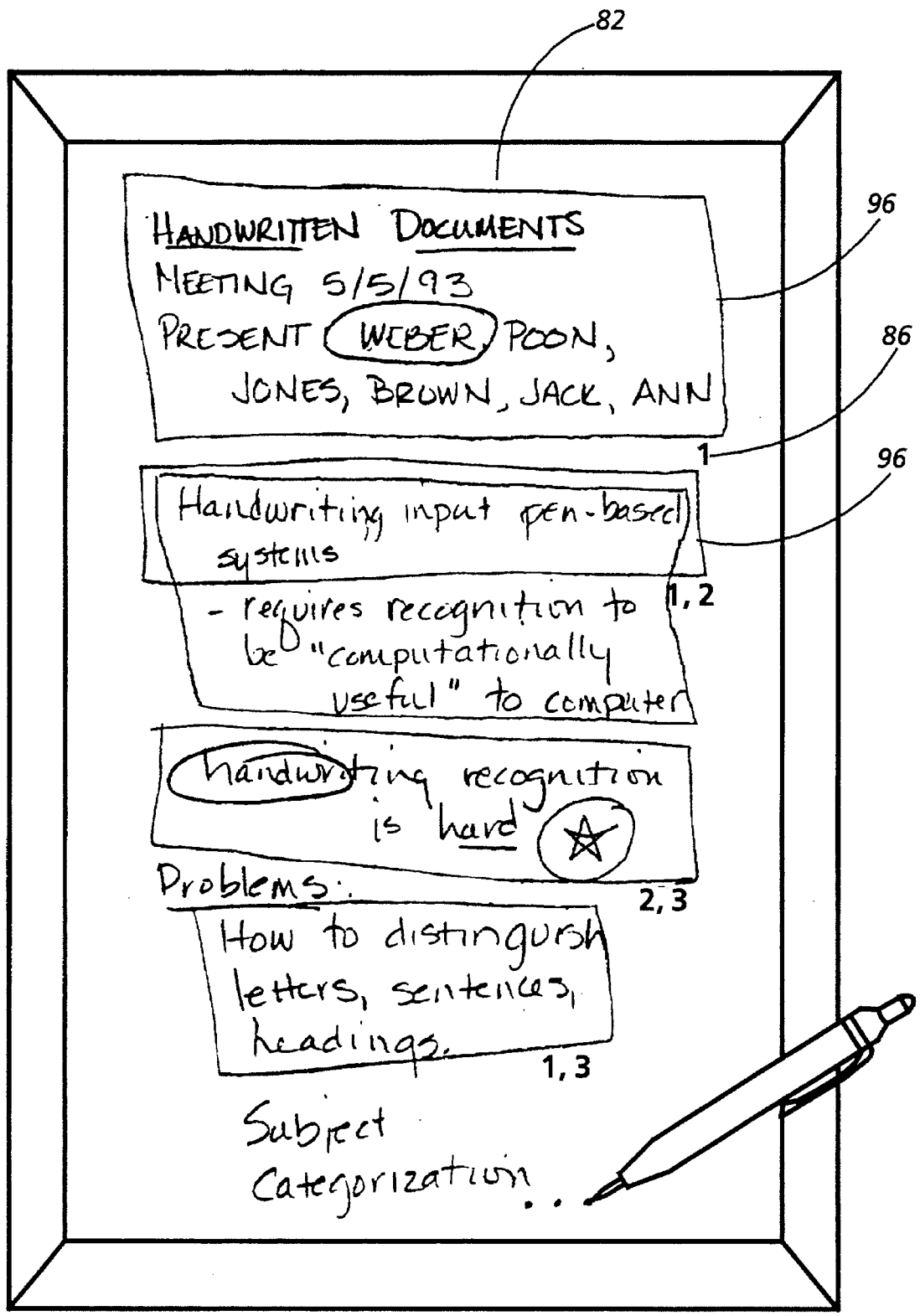
FIG. 7 shows the computer device of FIG. 4, including key object designations, and identifiers attached to data objects.

FIG. 7 shows an example of applying the key objects to the data in display area 82. The information in display area 82 is shown as having a particular grouping by the bounding boxes surrounding sections of text, such as bounding boxes 96 and 98. This grouping may be done prior to display, may be done by the user, or may be accomplished in some other way. All that is necessary is that the information be designated as discrete units of information. Bounding box 96 defines a first data object in the display area. The data object represented by bounding box 96 may be designated prior to the input of the user input data, so that the user determines which data object is being input to. Alternatively, the data object may be created after the data has been entered by designating object boundaries in the data structure storing the information.

The data object represented by bounding box 96 has been assigned to the first key object 84. This may have been done by the user selecting the key object and then touching a corner of the bounding box, or by some other method. The data object information 72 in data structure 70 has attached identifier information 74 showing the identifiers associated with that data object. Identifier 86, assigned to key object 84, appears in the display image with the data object, in this case near the lower right corner of the bounding box, to visually identify the attachment.

Other data objects may be associated with key objects, as well. As can be seen in FIG. 7, the data object represented by bounding box 98 is attached to key objects 84 and 88 by the visual representation of their identifiers. The data in object 98 was created before key object 88 was created, but it can be marked with the key object at any time. Because of the independence from creation time, it is possible to show an association in data that may not be recognized until some time after the data is created.

Figure 8:
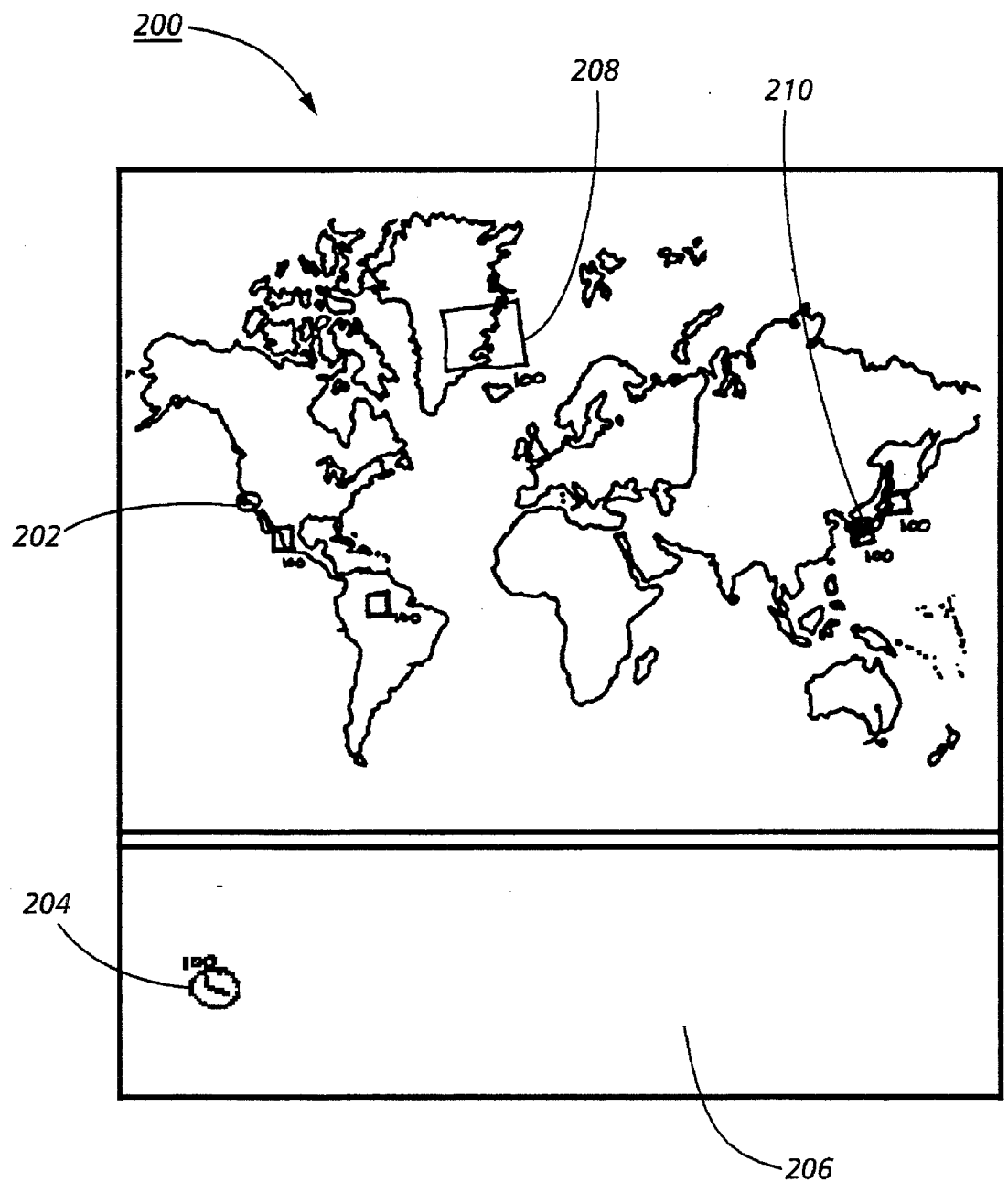
FIG. 8 shows an application of the present method to an image document.

FIG. 8 shows another example of how the method described above may be applied to create an associative data structure. Display image 200 is a map, made up of a bitmap image. The user has indicated an area 202 which is to be designated a key object. It may be copied into another area of the display image 206 as a separate image 204. Other areas of the graphical image are specified as data objects, which have been associated with the key object. As shown in the figure, one data object 208 may be specified a different size than another data object 210. Each data object is shown with its accompanying identifier, allowing the user to visually perceive the association between the objects. The data object data structure underlying the image will record the size and locations of the specified data objects, and will have associated with each the machine recognizable identifier of the key object. The computer has no other knowledge of the interpretation of the objects. The data objects may indicate areas affected by major earthquakes, sites of active volcanoes, or places where the user intends to travel to, depending upon the intention of the user. The key object 204 serves as a visual reminder to the user of the meaning of the association.

2. Retrieving Computationally-Significant Information

FIGS. 26–30 illustrate examples of retrieval of information compiled by the system described above.

Figure 26:
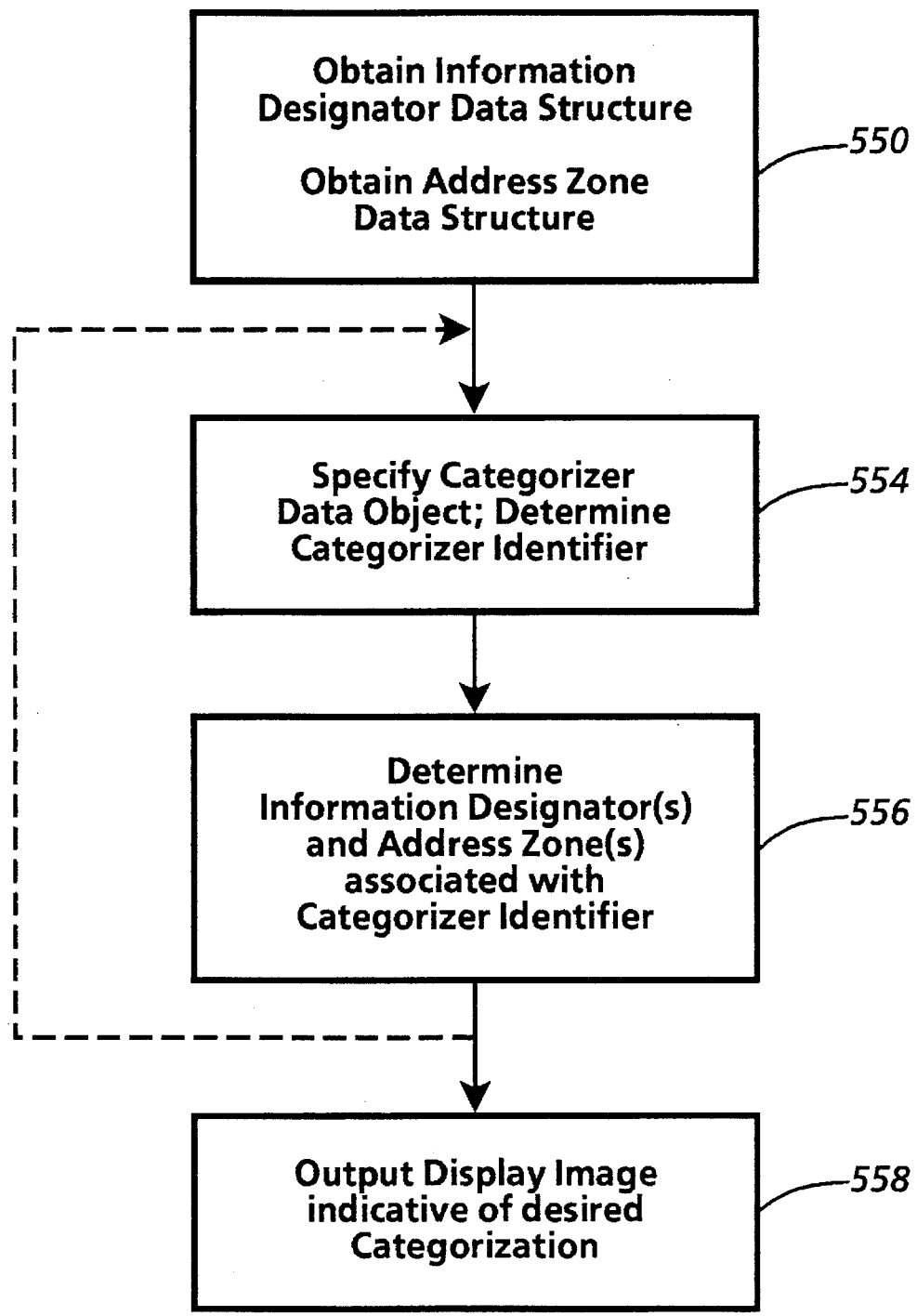
FIG. 26 is a flowchart showing the general method of retrieving computationally-significant associations in uninterpreted data according to the present invention.

The flowchart of FIG. 26 describes the general method of retrieval of computationally-significant information about uninterpreted data according to the present invention. The step in box 550 will obtain an information designator data structure and an address zone data structure. These data structures need not necessarily have been created at the same time. For example, an information designator data structure may have been created during the first of a series of meetings, and reused, and perhaps even added to, for remaining meetings. Each individual meeting may be stored in a separate data structure, but all would be retrievable using the information designator data structure.

The step in box 554 will specify the data object that is to be used to define the categorization. The data object may be an information designator, with the intent that all address zones associated with that particular information designator be retrieved. The data object may alternatively be an address zone. All information designators related to the specified address zone may be retrieved, or all other address zones associated with one or more similar information designators may be retrieved, depending upon the user's preference and command. Step 554 may further include specfying boolean operations to be performed on the data objects. Whatever data object is chosen, the information designator identifier, or identifiers, associated with that object will be determined in step 554.

The step in box 556 will use the identifier of the specified object to determine associated information designators and address zones, depending upon the identifier and the desires of the user, by searching through the data structures, and cataloging objects associated with the categorization identifier. The step in box 558 may output a display image which indicates the results of the search if the user desires.

Steps 554 and 556 in FIG. 26 may be repeated with each object in one of the data structures used as the categorization object.

Figure 27:
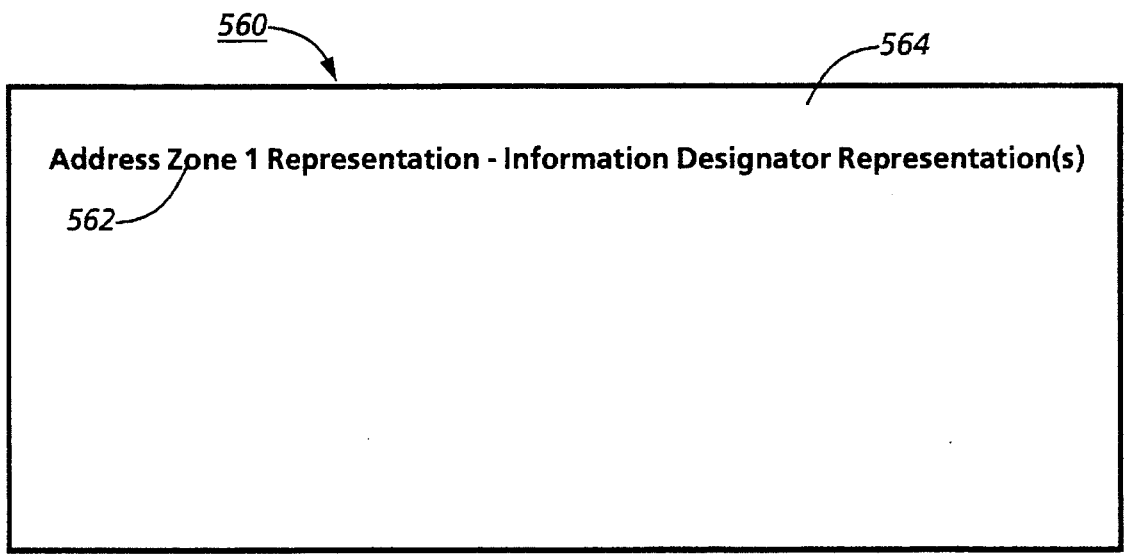
FIG. 27 illustrates a general output of data showing associative relationships between address zones and information designators.

The display image produced in step 558 may simply indicate the association of objects, without showing the objects themselves. Display image 560 in FIG. 27 shows an illustration of a possible result of the operation of the method described in FIG. 26, using address zones as categorization objects. Display image 560 includes a representation 562 of an address zone. This representation may be the strokes of the zone itself, or may be a compressed image. The representation may further be simply an indicator representing the address zone, for example its address, or in the case of the notetaking system described below, a time stamp.

Similarly, information designator representation 564 may be an image of the strokes in the information designator, a representation of the identifier, or a label produced to describe the information designator.

Figure 9:
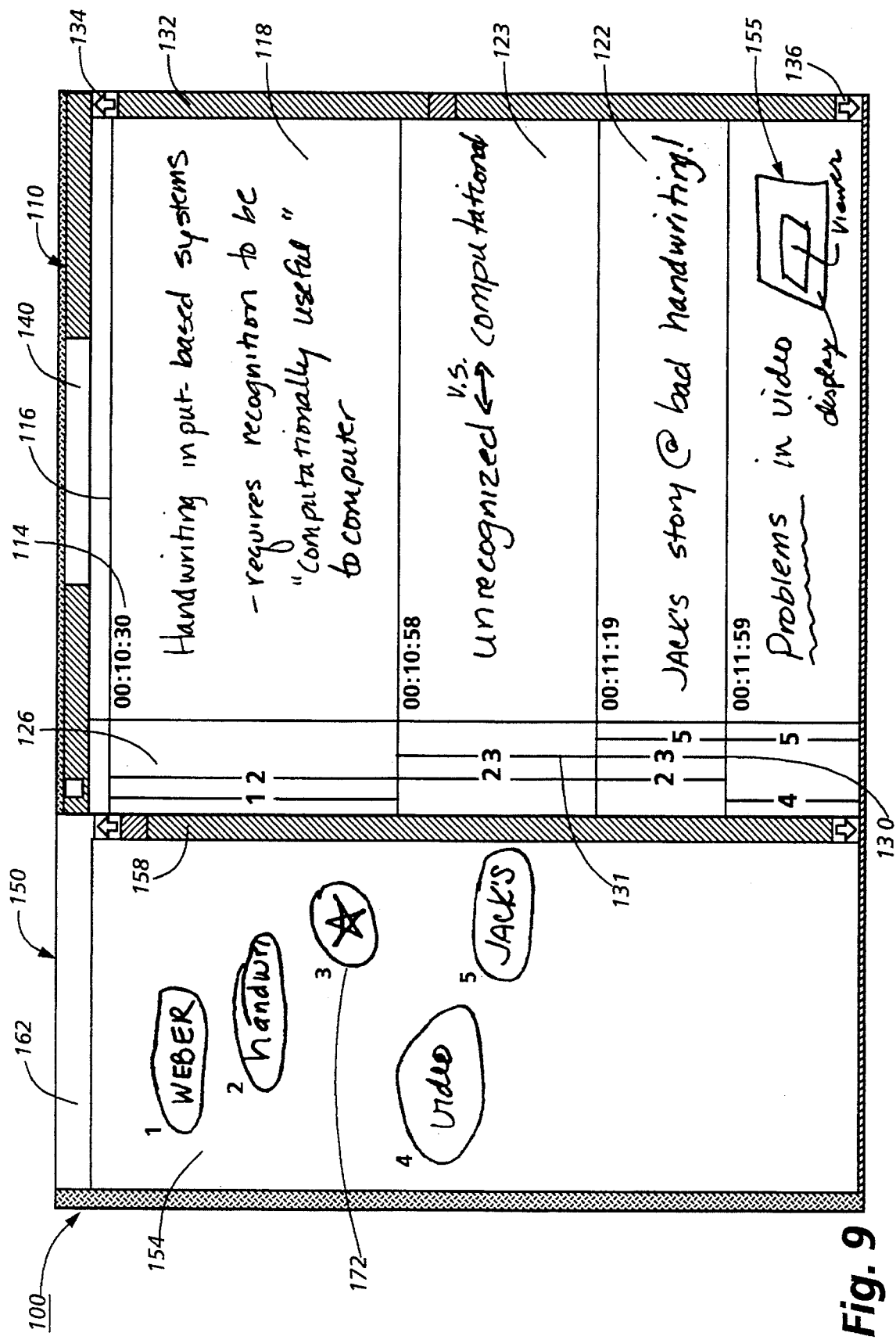
FIG. 9 shows a user interface for a notetaking system employing the method of the present invention.
Figure 28:
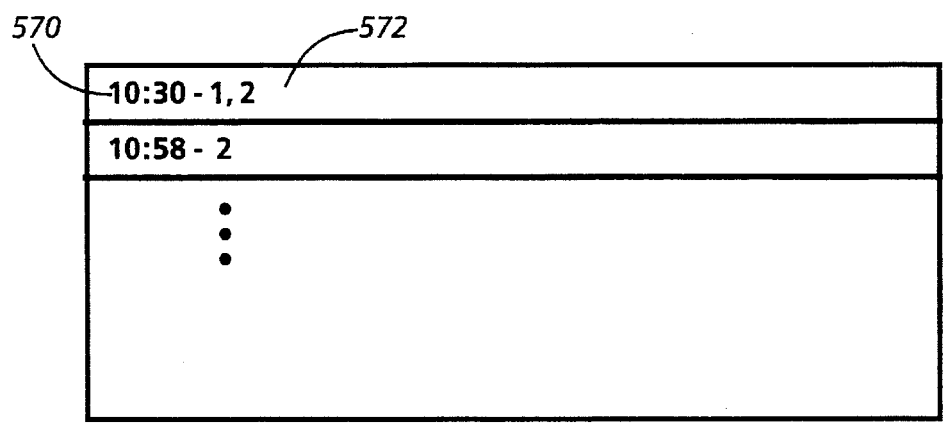
FIG. 28 shows an example output illustrating time zone information and associated information designator information.

FIG. 28 shows an example of a display list that might be created as a result of a data retrieval operation over the data structures represented by the image in FIG. 9 to create a log. Address zone 570 is a time stamp of the first address zone. Information designator identifier representation 572 shows the information designator identifiers stored with address zone 570, indicating to the user that those information designators are associated with address zone 570.

Figure 29:
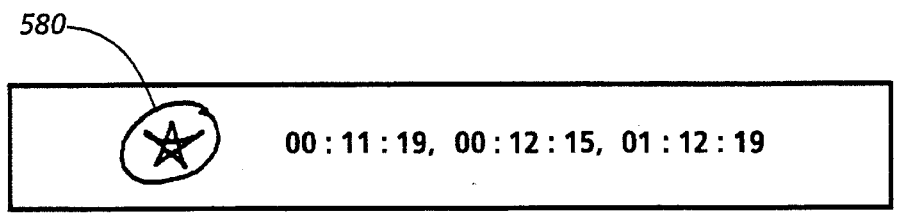
FIG. 29 shows an example output illustrating information designator information and associated address zone information.

FIG. 29 shows an alternate representation, in which an information designator 580 is selected as the categorizer. All address zones associated with the information designator identifier assigned to information designator 580 will be retrieved as shown in FIG. 29, and placed in the display area so that the address zones are perceived as being associated with the information designator.

3. Manipulating Computationally-Significant Information

Figure 30:
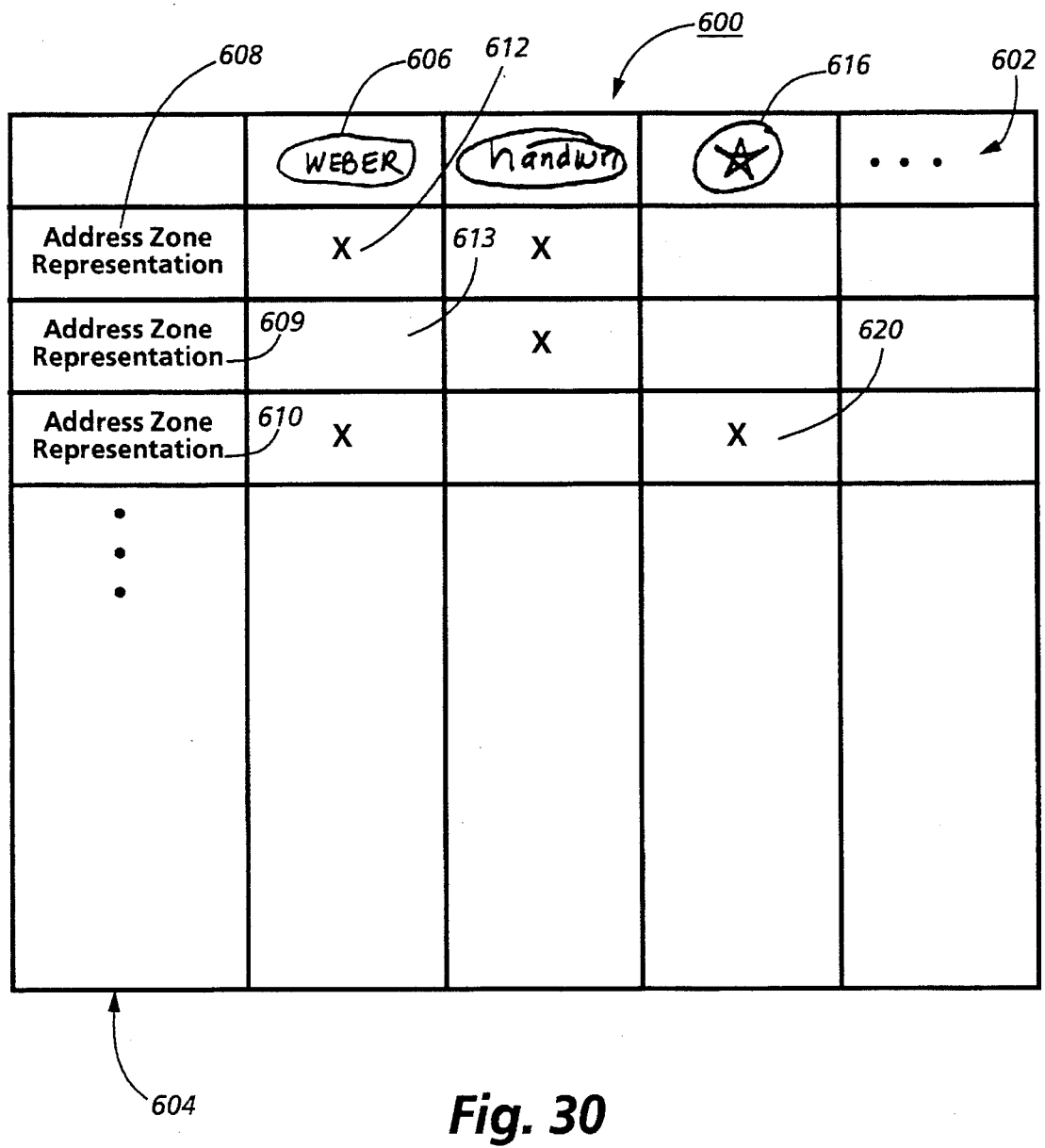
FIG. 30 illustrates a tabular display of associative data.

FIG. 30 describes a further aspect of the present invention. A display image of table 600 is shown in which the information designator data structure and the address zone data structure have been correlated to provide a table grid, with the information designator representations in one dimension 602, and the address zone representations shown in the second dimension 604. As described above, these representations may be objects themselves, or some other indicative representation of the object.

An association between information designator 606 and address zone 608 is shown in cell 612 by an image indicative of an association between information designator 606 and address zone 608, in this case an "X" displayed in the cell. Cell 613 similarly shows that there is no association between information designator 606 and address zone 609 by displaying a as blank image, or empty cell.

Figure 31:
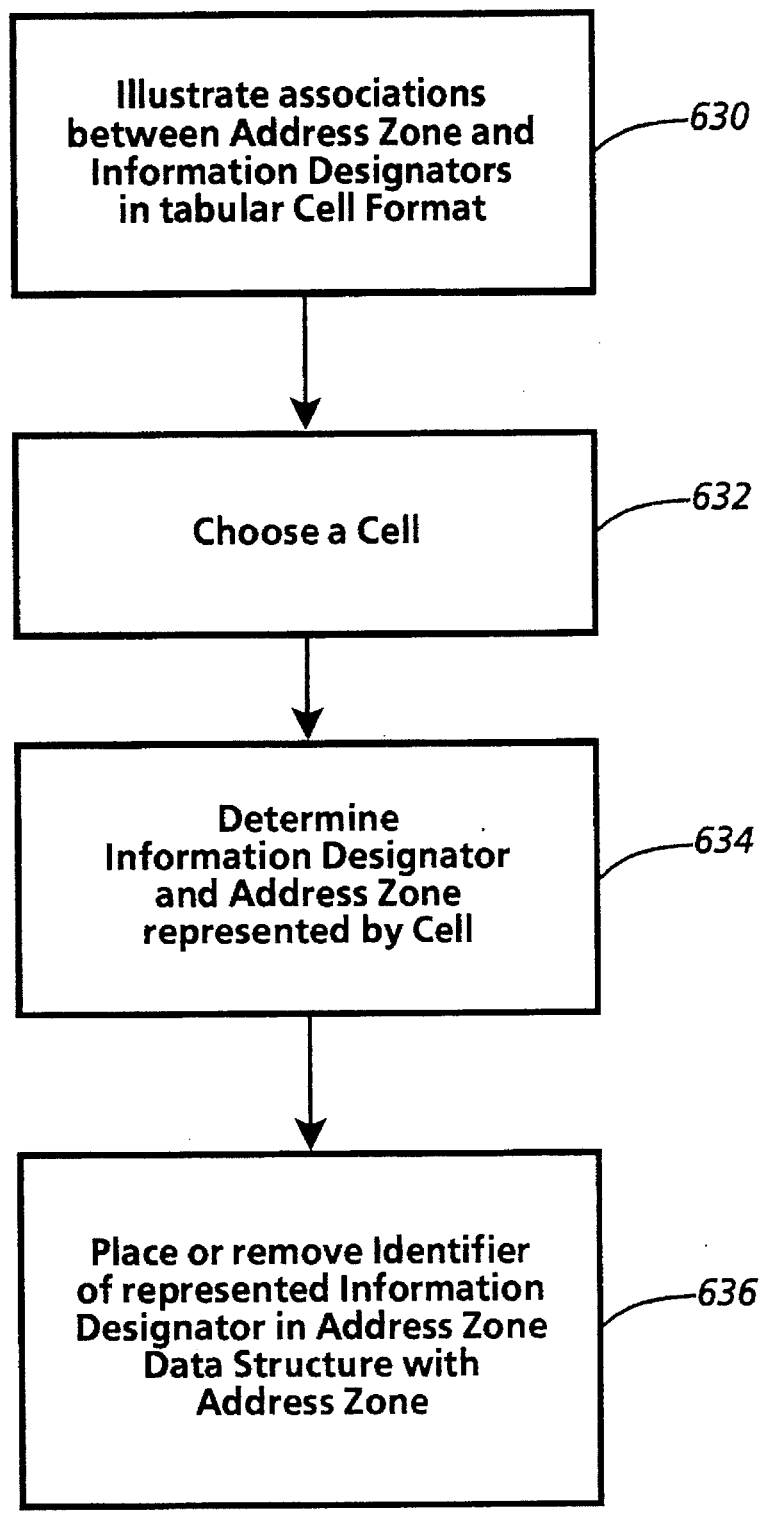
FIG. 31 describes steps in manipulating associative relationships between address zones and information designators using the tabular display of FIG. 30.

In addition to simply displaying the associations between information designators and address zones, table 600 may further be used to manipulate the address zone data structure. The step shown in box 630 of FIG. 31 illustrates association data between address zones and information designators as described in relation to FIG. 30. The step in box 632 selects a particular cell in the table. An association may be established, or removed, between an information designator and an address zone by selecting the cell common to both. For example, cell 620 may be selected if the user desires to alter the association between information designator 616 and address zone 610. The step in box 634 determines the information designator and the address zone represented by the selected cell.

Depending upon the desires of the user, the step in box 636 will either place or remove the identifier of the information designator determined in step 634 in the address zone data structure with the address zone determined in step 634. For example, to establishment an association between information designator 616 and address zone 610, the information designator identifier assigned to information designator 616 would be stored in the address zone data structure with address zone 610. Similarly, the information designator identifier could be removed from the address zone data structure should the user indicate a dissolution of the association between the information designator and the address zone.

C. An Implementation

The implementation discussion below describes an embodiment of the invention applied to a pen-based notetaking system, as described in the previously referenced and incorporated application Ser. No. 08/138,545). However, as will be seen from the accompanying description and applications, the method of the present invention is not limited to pen-based notetaking and recording systems, and is applicable to a wide variety of graphically-based input systems. Previously referenced application (Ser. No. 08/138,545) contains more information concerning the user interface and operation of the notetaking and recording system.

In the embodiment described herein, the system may further simultaneously record a user perceived event, and notes concerning the event may be recorded in the address zone display area by the user. An address zone may represent a time zone, and have included in its identifying data a time stamp which marks the start of each time zone which is correlated to a particular point in the recording.

1. User Interface Description

The user interface of the system and method of the present embodiment provides a flexible, easy to use display environment using a graphically-based computer system to establish computationally significant relationships in data. The present embodiment is particularly useful notetaking applications, in that the system is designed for facilitating a system user's natural note-taking style, and for adapting to a variety of note-taking situations.

FIG. 9 illustrates display screen 100 as it would look while a system user was taking notes about a meeting on handwriting systems. When the system is first initiated, a display screen 100 of FIG. 9 is presented on the display. At initialization, the windows may be blank, or the palette area, described below, may contain pre-loaded data items. Display screen 100 includes three workspaces which are implemented in the illustrated embodiment as windows. Address zone workspace 110 is the workspace where the system user creates address zones, or spatial regions, for the entry of user-produced data. Address zone workspace 110 shows, for illustrative purposes, four spatial regions that have been previously created. The beginning of spatial region 118 is marked by horizontal line 116, and shows address value 114. Another interesting feature of the present embodiment is that address zones may be purposely created and left empty as address placeholders for portions of an event for which the user has no information to enter. Each of the spatial regions includes a separate region called a "striping" region, as illustrated in spatial region 126. The striping region is a portion of the spatial region used for associating information designators with address zones, as will be explained below. The striping region is shown at the left of workspace 110, but it need not be positioned there.

As a window implementation, address zone workspace 110 includes many of the conventional features associated with a window implementation. Scroll bar 132 at the rightmost side of address zone workspace 110 may be used for scrolling through created workspaces using up and down arrows 134 and 136. In the illustrated implementation, display screen 100 does not provide for re-sizing any of the workspaces for efficiency and performance reasons. However, in other implementations, response time may not be affected by re-sizing, and the three workspaces presented in display screen 100 could have display features and functions for resizing and moving the windows in display screen 100. As has already been noted, while address zones are created in a linear and sequential order, typically by time, user-produced event data may be entered into any created address zone, in any sequence. In addition, user-produced event data already entered into a created address zone may be edited after entry using a set of limited functions. So a user may need to scroll an off-screen address zone into view in address zone workspace 110 in order to be able to access and edit the user-produced event data stored in the address zone. Area 140 may be reserved for a document or log name indicating the subject matter of the notes.

As will be described in more detail in relation to the data structures of the present invention, the address zone data structures represented by the spatial regions in workspace 110 are implemented as objects in the object-based implementation of the illustrated embodiment. As such, they may be manipulated by manipulating the images that represent them in address zone workspace 110. Address zones may also be deleted in display screen 100 resulting in the address zone data structure represented by the address zone being deleted from memory.

Information designator workspace 150 is the workspace where the system user may create and store, in region 154, information designators for purposes of display. As with workspace 110, information designator workspace 150 includes many of the conventional features associated with a window implementation. Scroll bar 158 at the rightmost side of information designator workspace 150 may be used for scrolling through the contents of region 154 for purposes of reviewing or searching for an information designator that may be off-screen. Area 162 may be reserved for a document or log name indicating the subject matter of the notes. Information designator workspace 150 has a workspace 150 data structure (not shown) associated with it for storing data related to the workspace. For example, since the system user may create an information designator in workspace 150, provision is needed for storing the user-produced event data entered in workspace 150 until the gesture for creating an information designator is received. For example, a system user may be interrupted during the creation of an information designator, and not complete the actions until some time later. The workspace 150 data structure stores these strokes and their locations until they are referenced again.

FIG. 9 shows user-produced event data entered in each of the spatial regions in workspace 110. It can be seen that this user-produced event data includes picture-like or graphical information 155, which is stored as strokes in address zone data structure for the corresponding address zone.

Of particular interest in FIG. 9 is the use of information designators. Five information designators are shown displayed in information designator workspace 150. Each is displayed with its unique identifier (e.g., the ordinal numbers positioned at the upper left of each designator display object) and includes the user-produced event data designated as the information designator and the enclosure gesture used to create the information designator. The information designator workspace 150 in the illustrated embodiment is colloquially called the "keyword palette." It can be seen that information designator 172 may have been created in workspace 150, since it does not appear in any of the displayed address zones, although it could appear in an existing off-screen address zone. The system user has associated information designators with various address zone regions by using striping region 126. For example, following the process steps described in FIG. 20, the user first selects information designator 172 having unique identifier "3" assigned to it and then makes a vertical gesture in the striping region included in address zone 122. As a result, vertical line 130, interrupted by the unique identifier "3", is displayed in the striping region, representing to the user that the information designator 172 has been associated with the address zone data structure represented by address zone 122.

Another feature of the user interface can be seen in the display in the striping regions. In order to facilitate usage patterns in and visual organization of the information designator, unique identifiers that have been associated with several successive address zones are organized into columns in the striping region. For example, information designator 172 has been associated with both the address zone data structure represented by address zone 122, and with the address zone data structure represented by address zone 123. It can be seen that vertical line 130 in striping region 126 could have been positioned anywhere in that region, but it has been visually aligned with vertical line 131 which represents the same information designator.

The information designator data structures represented by the designator display objects in workspace 150 are also implemented as objects in the object-based implementation of the illustrated embodiment, and they too may be manipulated by manipulating the designator display objects that represent them in information designator workspace 150. For example, an information designator may be moved from one location to another in workspace 150. This will result in display area location data in the information designator data structure be updated with the new screen coordinates of the designator display object representing the moved information designator. In addition, information designators may also be deleted from workspace 150 by making a horizontal scratch gesture over a designator display object representing the information designator selected for deleting from workspace 150. This will result in the information designator data structure represented by the address zone to be deleted from memory, and will also result in the unique identifier assigned to the information designator selected for deletion being removed from any address zone data structure in which it has been stored, and being removed from display in the striping region.

For processing efficiency, the last selected or last created information designator remains as a selected information designator during subsequent processing until a new information designator is selected or created, so that the system user may omit the selection gesture when assigning an information designator the user knows is currently selected.

2. Input Description

In the Macintosh system described above, the pen input device is considered as a mouse input. Pen down is equivalent to a mouse click, and drawing is equivalent to a mouse drag. A pen (or mouse) inputs a series of positions, or "pixels," that it touches. The pen input is continuously tracked from pen down (touching the screen) to pen up (leaving the screen), forming a list of contiguous pixels. The pen input is sampled-the pixel position is detected at certain times, and the pixels in between each sample are filled in. The smoothness of the response to the pen input is directly proportional to the sampling rate of the stroke motion.

Each pen down to pen up is considered a stroke. Thus it is clear that a single letter or a single word may be made up of a number of strokes, depending on the writing style of the user. Clearly in this application, a mouse or any other graphically-based input system could be used to provide input as easily as the pen-based system. Because the system is modeless, the system looks at each stroke as it is made to consider whether or not it is a "gesture."

Figure 10:
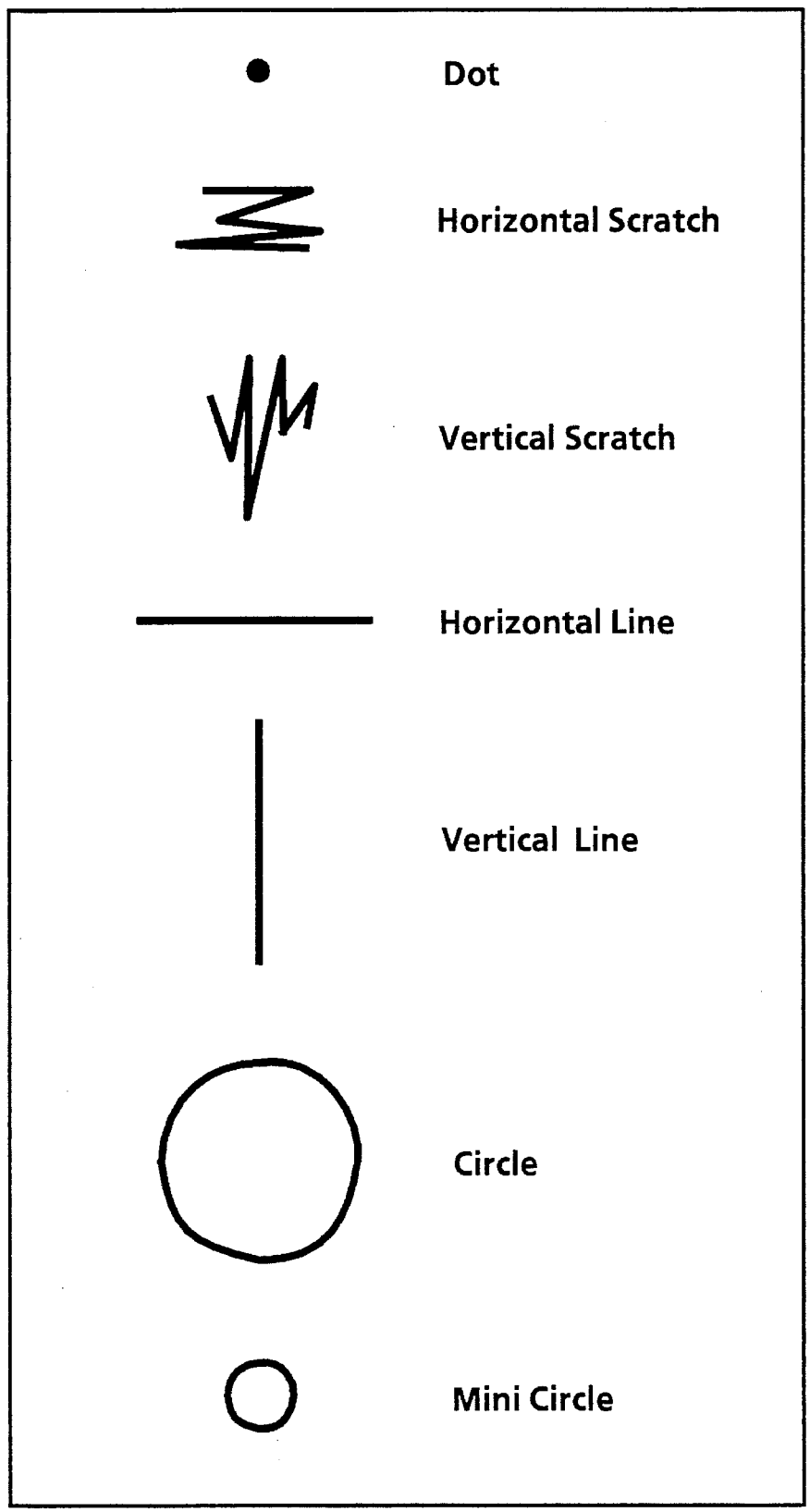
FIG. 10 shows an example of handwritten gestures detected by the system of the present embodiment.

FIG. 10 shows a list of examples of possible gestures detected in the present embodiment. The presently recognized gestures are dot (small point), horizontal scratch (a series of at least four horizontal lines in alternating direction), vertical scratch (a series of at least four vertical lines in alternating direction), horizontal line, vertical line, circle, and mini-circle. Clearly, other gestures may also be used, but the gestures here have been found to be useful in that they are easy to create, and are relatively different from regular handwriting. Since the gestures are entered by the user of a graphical input system, such as a pen or mouse, the gestures are unlikely to be perfectly drawn. For example, the circle, as shown, must be generally circular, but need not necessarily be an exact circle. In the present embodiment, empirical limits have been determined as described below to recognize intended gestures that may not be exactly horizontal or vertical with acceptable accuracy.

Figure 11:
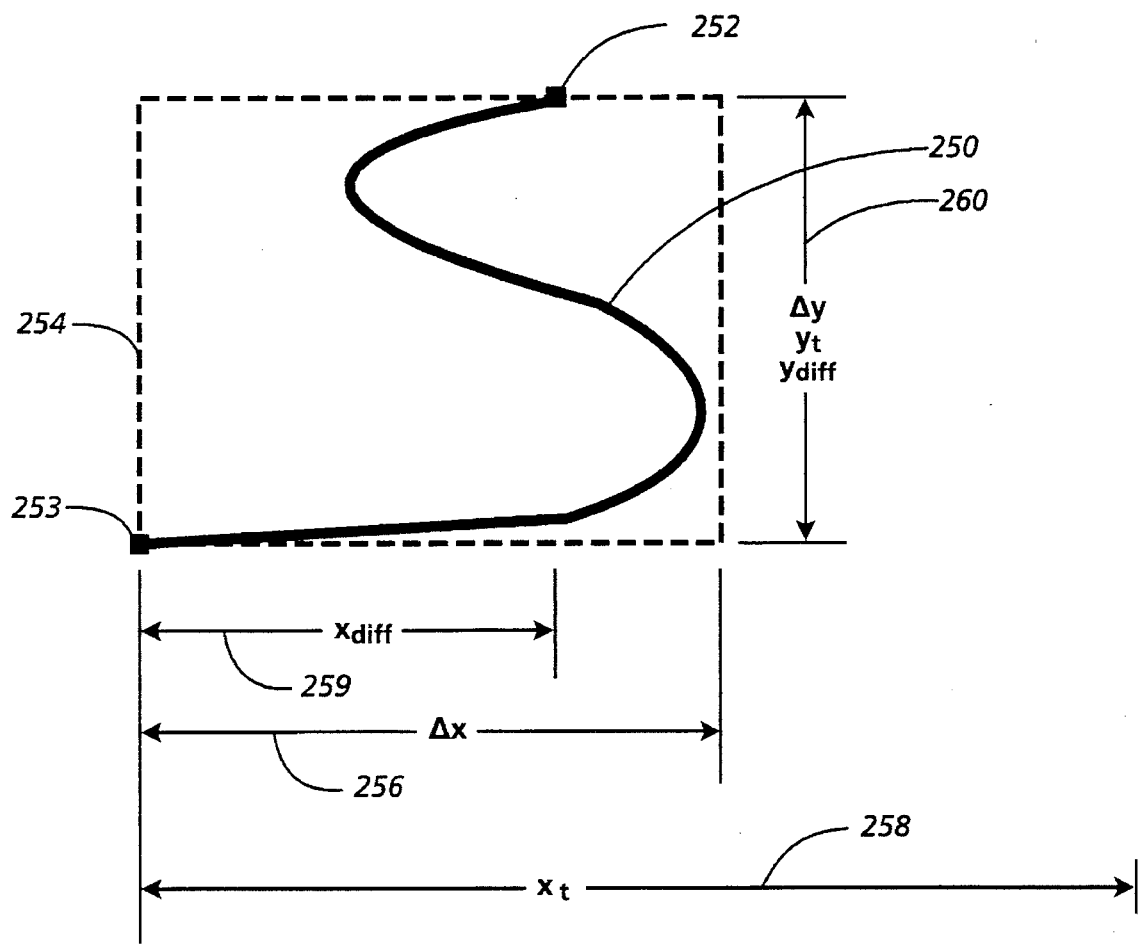
FIG. 11 shows an example of measurements used by the system to determine if a stroke is a gesture.

All strokes may be tested in a similar manner. A stroke 250 is shown in FIG. 11. Stroke 250 begins at point 252. A boundary box 254 is considered around the stroke, and directional transitions are noted. Three values in each dimension are noted—in the x direction, the overall width in x position $\Delta x$ 256 is calculated, the total traversed distance $x_t$ 258 is calculated, and the absolute value difference in position from the starting point 252 to the end point 253 $x_{diff}$ 259, is calculated. The $\Delta_y$ 260, traversed $y_t$, and difference $y_{diff}$, are also calculated. For stroke 250, $\Delta_y$, $y_t$, and $y_{diff}$ all happen to be the same.

Figure 12:
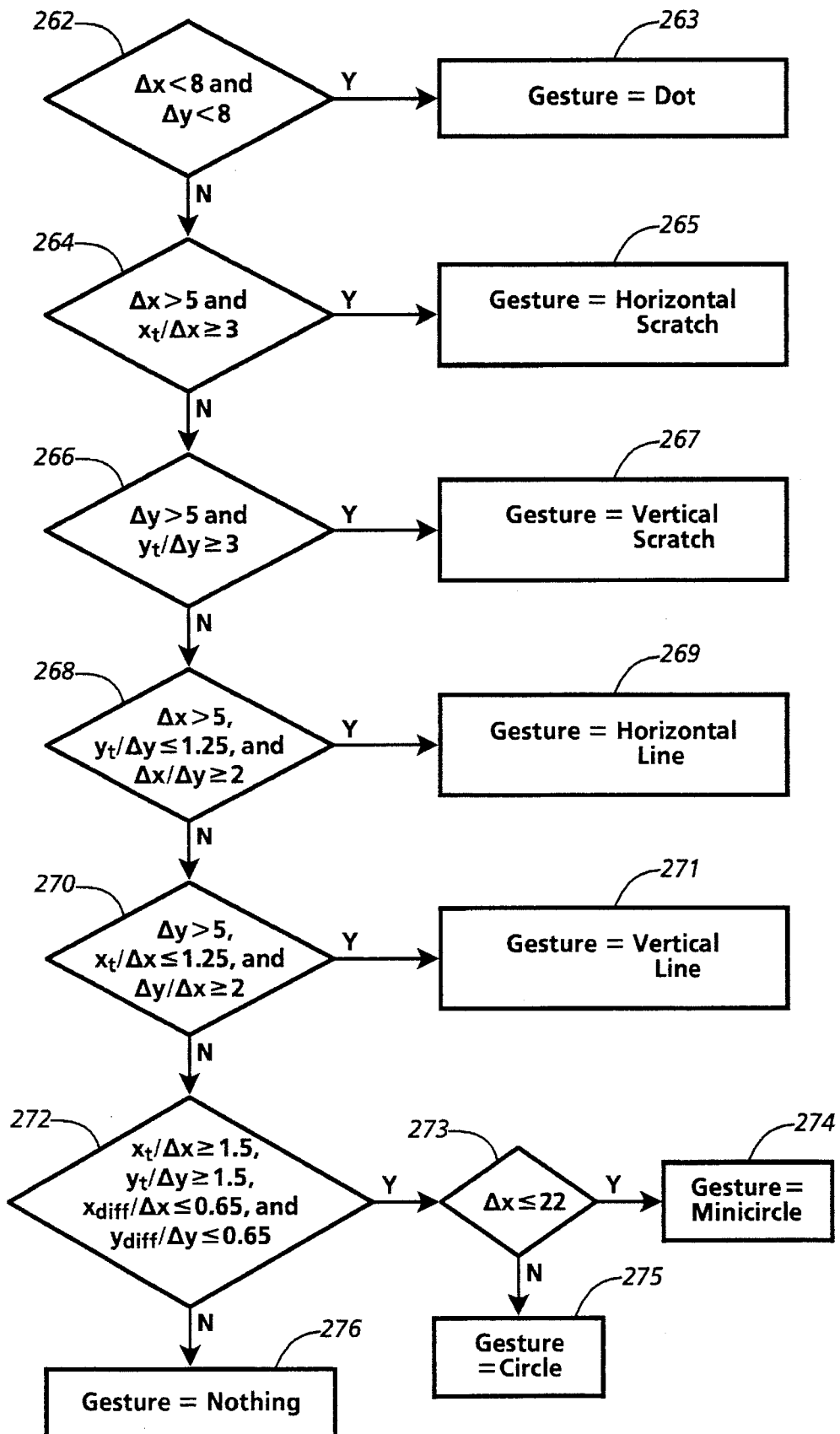
FIG. 12 describes the general method for detecting a gesture.

FIG. 12 describes the general method for detecting a gesture, given the information shown in FIG. 10. The step in box 262 checks to make sure the x and y widths are each less that eight pixels. So any very small dash will set the gesture value to a dot in the step in box 263. In the step in box 264, the total x distance traversed $x_t$ must be at least three times the x width $\Delta x$. When this is true and the width is at least 5 pixels, the gesture value is set to "horizontal scratch." The step in box 266 performs essentially the same test over the y distance, to detect a "vertical scratch." The step in box 268 detects a horizontal line by testing that the bounding box is much longer in the x direction than it is in the y direction. Likewise, the step in box 270 tests that a bounding box is much longer in the y direction than in the x direction.

The step in box 272 tests to see that the stroke has at least come almost back on itself in both the x and y directions, and that the starting and ending points are relatively close together. If that is true, then the step in box 273 also checks to see if the x width $\Delta x$ is less than 22 pixels. If it is, then the gesture value is set to a mini-circle. Otherwise, the gesture is set to a circle.

If none of the above conditions is found, as would be the case with stroke 250, then the step in box 279 sets gesture to "nothing," or no gesture. The pixel values as shown in FIG. 12 have been empirically determined for the present embodiment. Other relative values may be used to achieve similar results, since it is simply the proportional comparison which is important. Other methods may also be used to detect gestures besides the method here presented. For example, strokes could be divided into directional segments, and the properties of the segments used to determine the gesture. It has been found, however, that the method herein discussed works well in the present embodiment.

Some strokes are considered gestures when they appear in particular areas of the display screen, but are not gestures in other areas. For example, the transport control area only recognizes a horizontal stroke as a gesture. A horizontal scratch is considered a delete gesture in any display area except the transport control display area. Table 1 provides a summary of the definitions of various gestures that are discussed in more detail in FIGS. 14–17. Note that vertical lines have different meanings in different areas of the display.

In the present implementation, it is generally preferable to have a gesture checking routine which checks and returns values for each valid gesture in the system, as shown in FIG. 12. In areas in which the returned gesture is not valid, the operation may simply ignore the inappropriate gesture and deal with the stroke in the appropriate way. In the discussion of individual gesture recognition hereinafter, only those gestures that are valid in a particular area will be considered.

Figure 13:
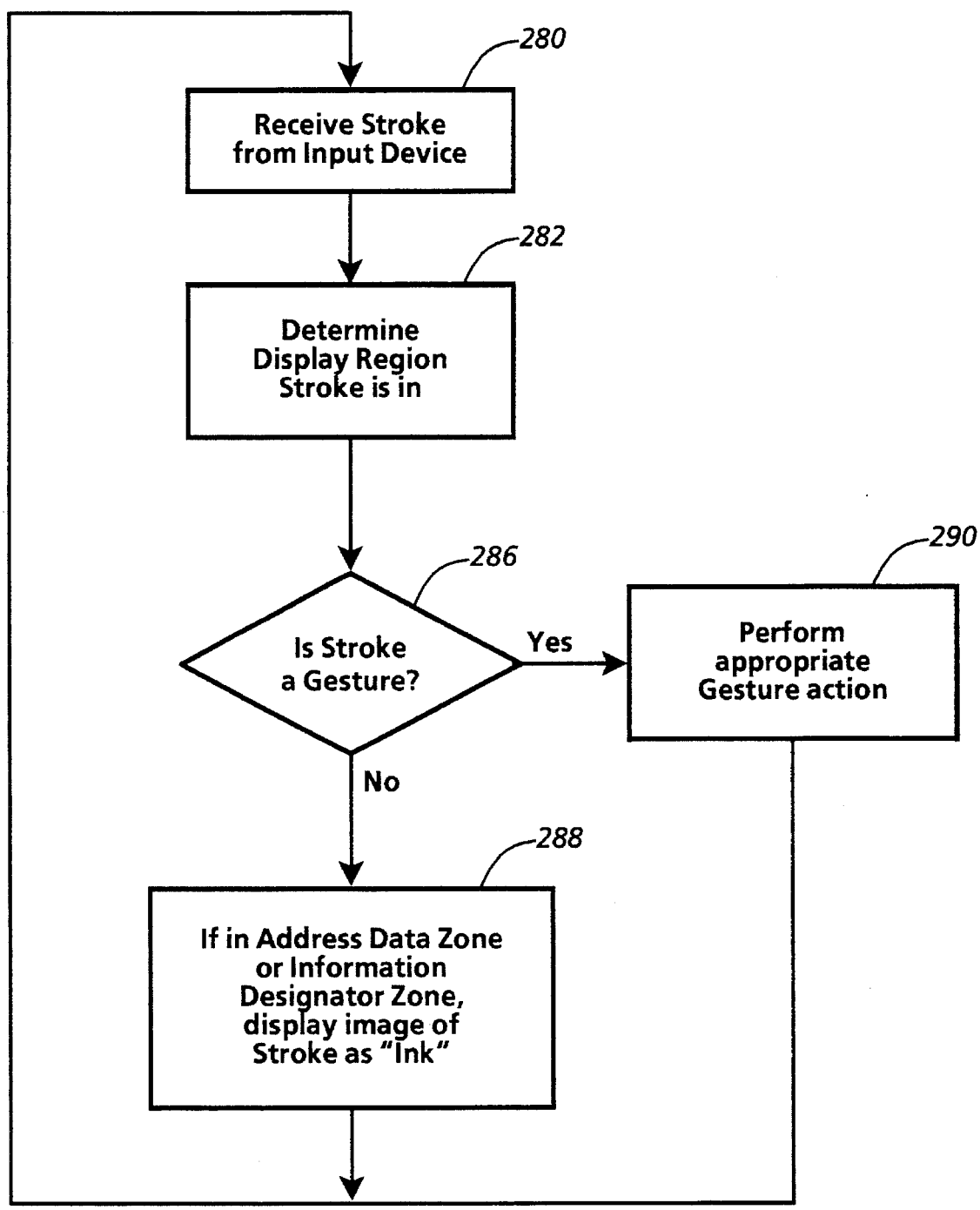
FIG. 13 describes the general operation of the system in response to a stroke from the input device.

FIG. 13 describes the general operation of the system in response to a stroke from a graphical input device. The step in box 280 receives the stroke. The step in box 282 determines the display region that the stroke has been made in. The stroke is considered "in" the area which it starts in.

TABLE 1

| | Gestural Defination | |
|---|---|---|
| STROKE | INPUT AREA | ACTION |
| Dot | Key Object Display area | Select Key Object |
| Horizontal Scratch (horizontal back and forth) | any Display Area | Delete/Erase stroke |
| Horizontal Line | Data zone Display Area | Create data zone |
| Vertical Line | Data zone Display Area | Manipulate data zone boundary |
| Vertical Line | Striping Area | Attach Key Object Identifier |
| Circle | Key Object Display Area, Data zone Display Area | Create Key Object |
| Mini-circle | Key Object Display Area, Striping Display Area | Select Key Object Identifier |

So, for example, if the stroke were to cross a time zone boundary, the stroke would be attached to the address zone that the pen initially went down in.

The step in box 286 determines if the stroke is a gesture. When a valid gesture is input, the step in box 290 performs the appropriate action based on that gesture. If the stroke is not a gesture, the input stroke is displayed as an image, or "ink," in the address zone or information designator display areas in the step in box 288.

FIGS. 14–17, as mentioned above, discuss in more detail the identification of valid gestures shown in step 286 of FIG. 13. Steps 290–296 determine in which input display area the stroke originated.

The step in box 292 determines if the stroke has been made in the address zone display area. if it has, the step in box 300 determines whether the stroke is an appropriate gesture in the address zone display area, as will be described in relation to FIG. 15.

The step in box 294 determines if the stroke has been made in the information designator display area. If it has, the step in box 302 determines whether the stroke is an appropriate gesture in the information designator display area, as will be described in relation to FIG. 16.

The step in box 296 determines if the stroke has been made in the information designator striping area. If it has, the step in box 304 determines whether the stroke is an appropriate gesture in the information designator striping area, as will be described in relation to FIG. 17.

Figure 15:
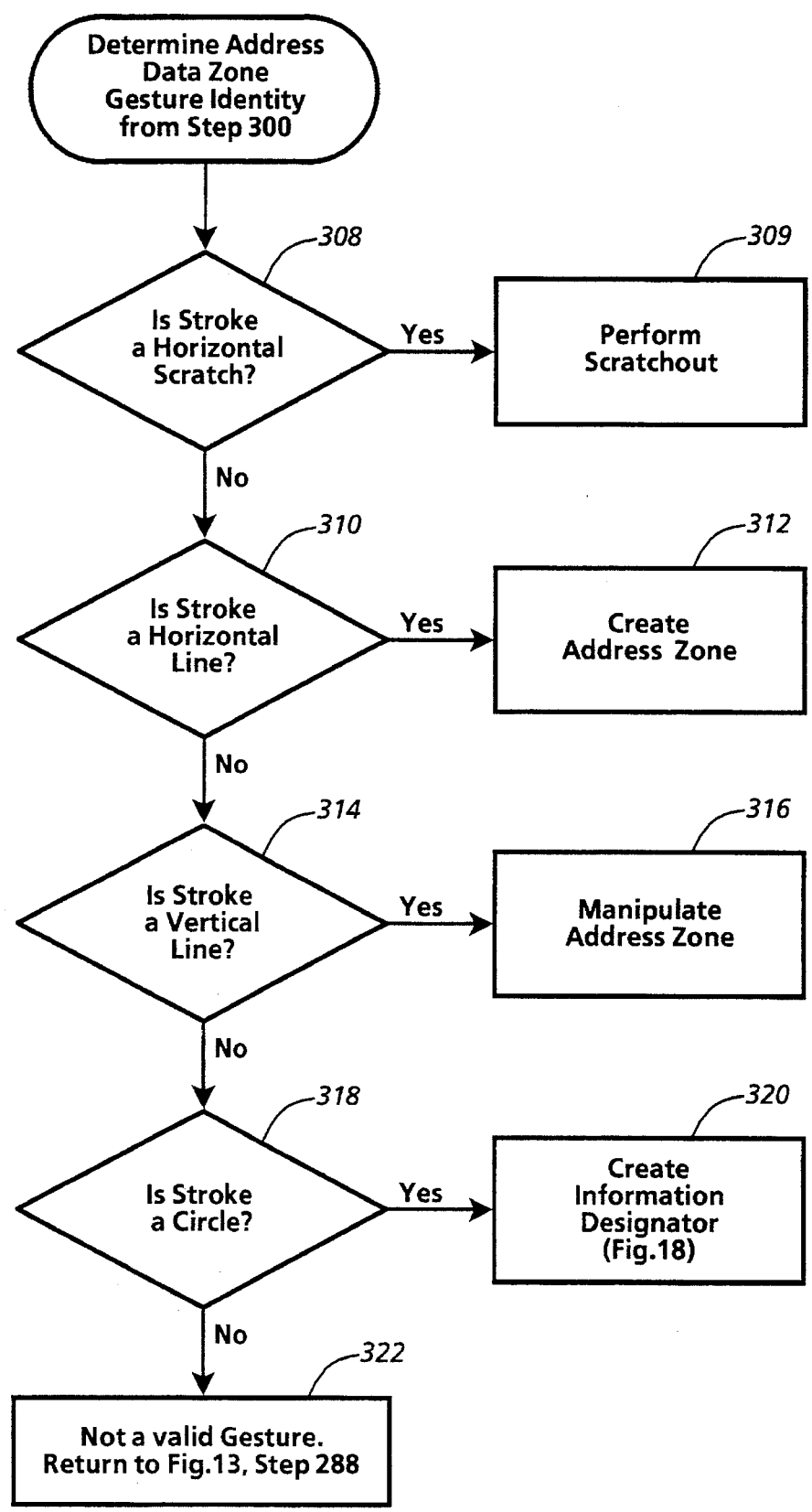

FIG. 15 describes the method of determining a gesture in the address zone display area as described in step 300. The step in box 308 determines whether the stroke is a horizontal scratch. If so, the step in box 309 performs a scratchout, or delete procedure, over the strokes beneath the scratchout. The step in box 310 determines whether the stroke is a horizontal line. If the line is horizontal, then in the step in box 312 it is considered a gesture which indicates that an address zone should be created. The step in box 314 determines if the stroke is a vertical line. If so, then in the step in box 316 it is considered a gesture which indicates that an address zone should be manipulated—made larger or smaller. More detail concerning scratchout and the creation and manipulation of address zones may be found in previously referenced application (Ser. No. 08/138,545).

The step in box 318 determines if the stroke is a circle. If the stroke is a circle, then in the step in box 320 it is considered a gesture which indicates that an information designator should be created, as will be discussed in relation to FIG. 18.

If none of the above gestures—a horizontal scratch, a horizontal line, a vertical line, or a circle—is recognized, then in the step in box 322 the stroke is determined not to be a gesture, and the system returns to step 288 of FIG. 13 to turn the stroke into ink on the display screen.

Figure 14:
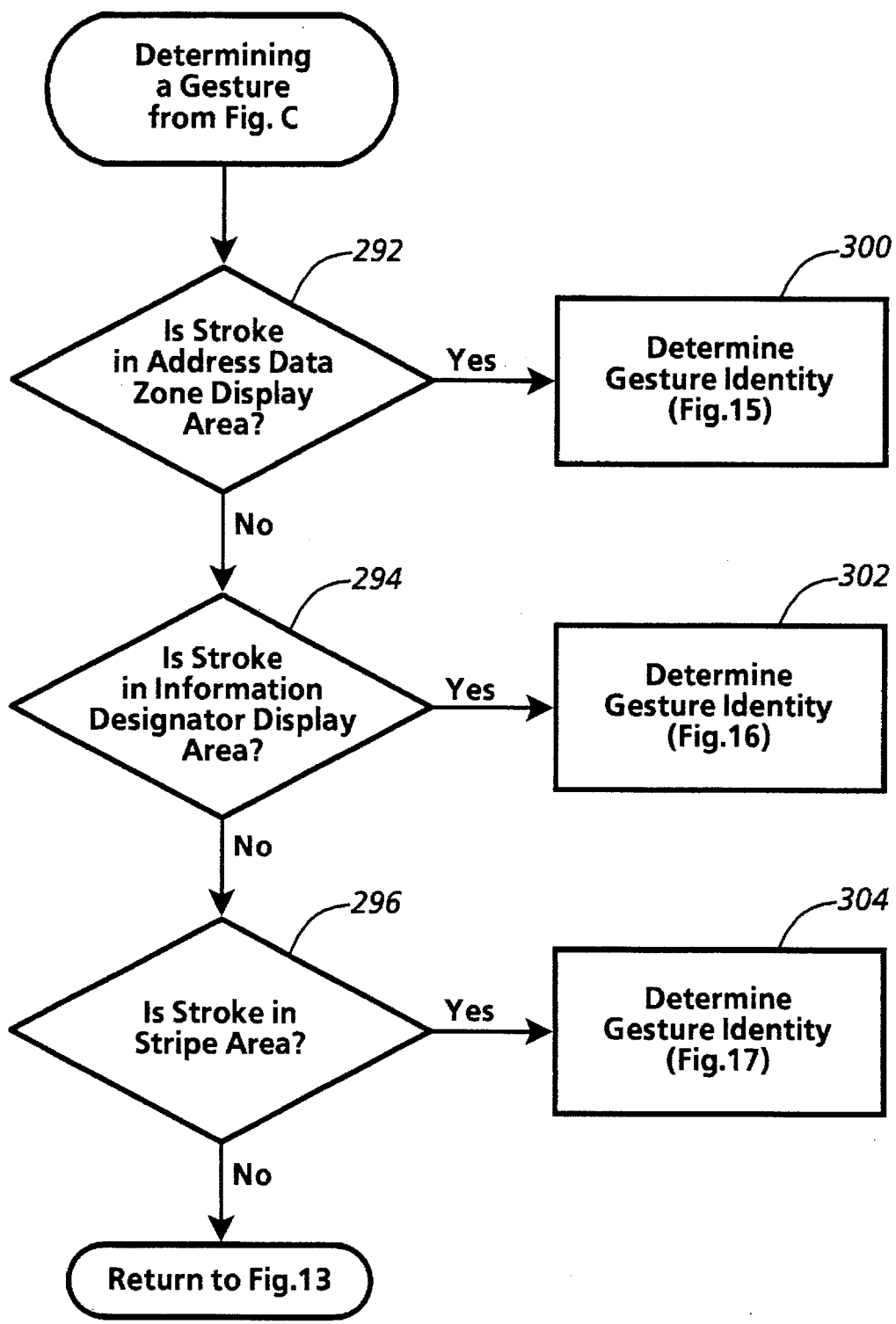
FIG. 14–17 describes the general steps in determining if a stroke is a gesture in an appropriate input area.
Figure 16:
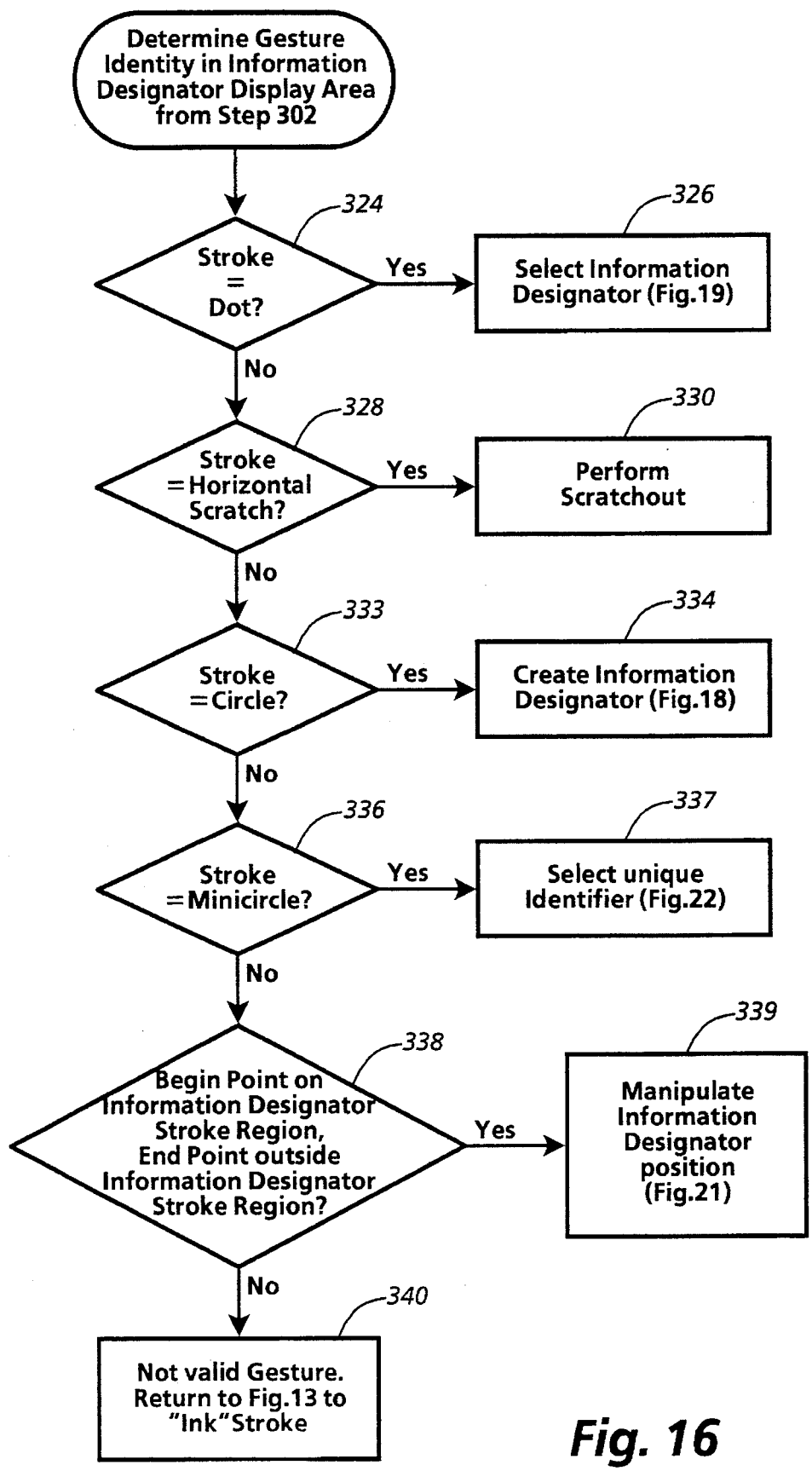

FIG. 16 performs similar steps to determine if a gesture has been made in the information designator display area, as discussed in step 302 of FIG. 14. If the stroke is a dot in the step in box 324, the step in box 326 selects an information designator, as will be discussed in relation to FIG. 21. The step in box 328 determines whether the stroke is a horizontal scratch. If so, the step in box 330 performs a scratchout, or delete procedure.

If the stroke is a circle in the step in box 333, the step in box 334 creates an information designator, as will be discussed in relation to FIG. 18. If the stroke is a mini-circle in the step in box 336, the step in box 338 selects an information designator identifier image, as will be discussed in relation to FIG. 22.

The step in box 338 checks to see if the stroke is a line which begins in the area of an information designator, and ends outside of the information designator. This condition indicates that the position of the information designator should be changed. If so, the step in box 339 manipulates the position of the information designator in the information designator display area, as will be discussed in relation to FIG. 21. The step in box 338 is only performed for the information designator display region. In all other regions, a line must be horizontal or vertical to be considered a gesture, but any kind of stroke may be used to move an information designator.

If the stroke is not a valid gesture in the information designator display area, the step in box 340 returns to step 288 of FIG. 13 to turn the stroke into "ink" on the display screen.

Figure 17:
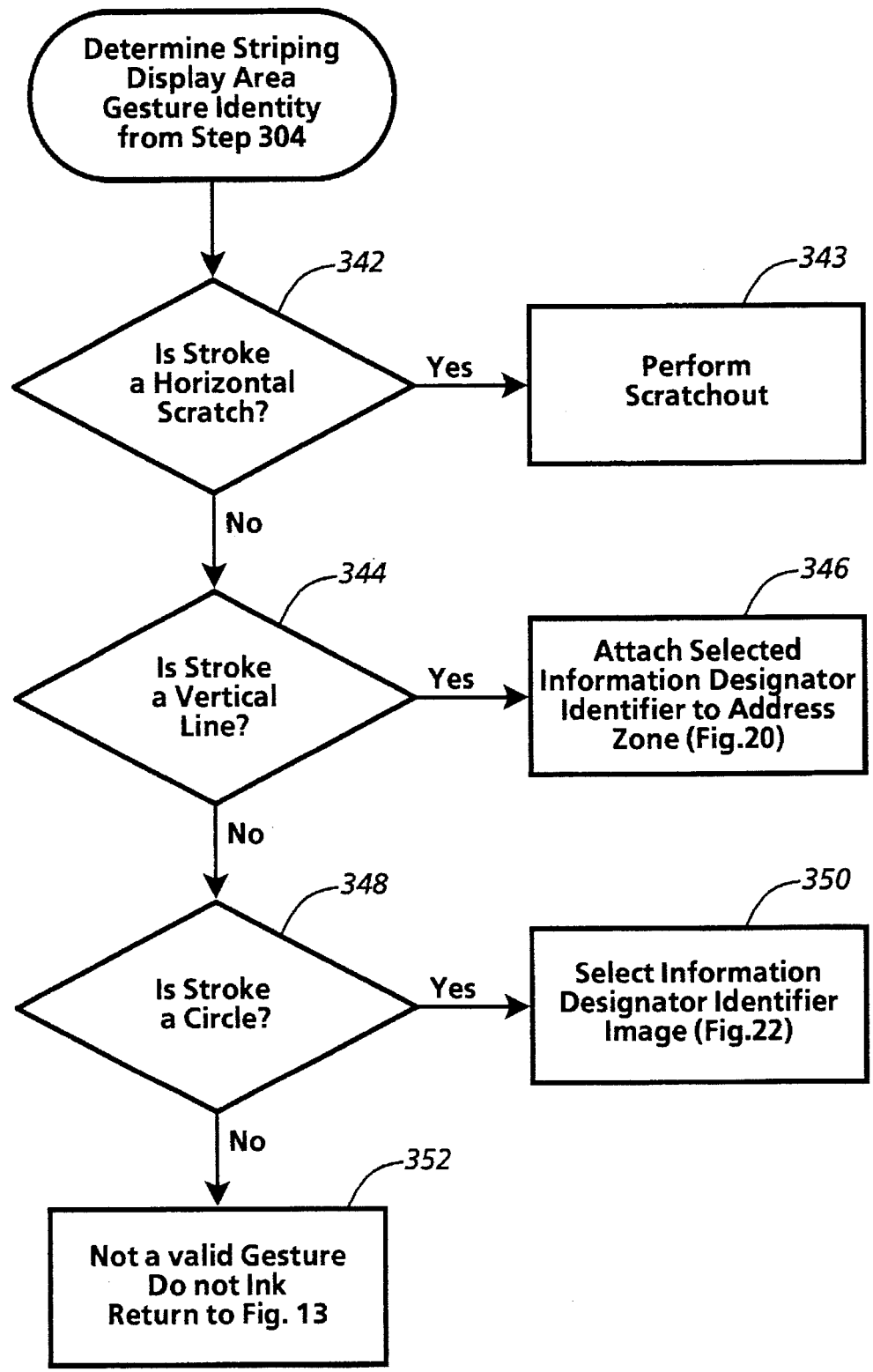

Similarly, FIG. 17 determines if a gesture has been made in the striping display area, as discussed in step 304 of FIG. 14. If the stroke is a horizontal scratch, the step in box 343 performs a scratchout. If the stroke is a vertical line in the step in box 344, the step in box 346 attaches the identifier of the current active information designator to the striping area attached to an address zone, as will be described in FIG. 20.

If the stroke is a circle in the step in box 348, the step in box 350 selects an information designator identifier image.

In the striping display region, only gestures identified by horizontal scratches, vertical lines, or circles are allowed. No writing is allowed, so if the stroke is not one of these gestures, the stroke is not "inked" and the step in box 352 returns to step 280 of FIG. 13.

Once the gesture command has been identified, the system will deal with it in a manner appropriate to the command. FIGS. 18–22 describe the operation of the commands relating to information designators described above.

Figure 18:
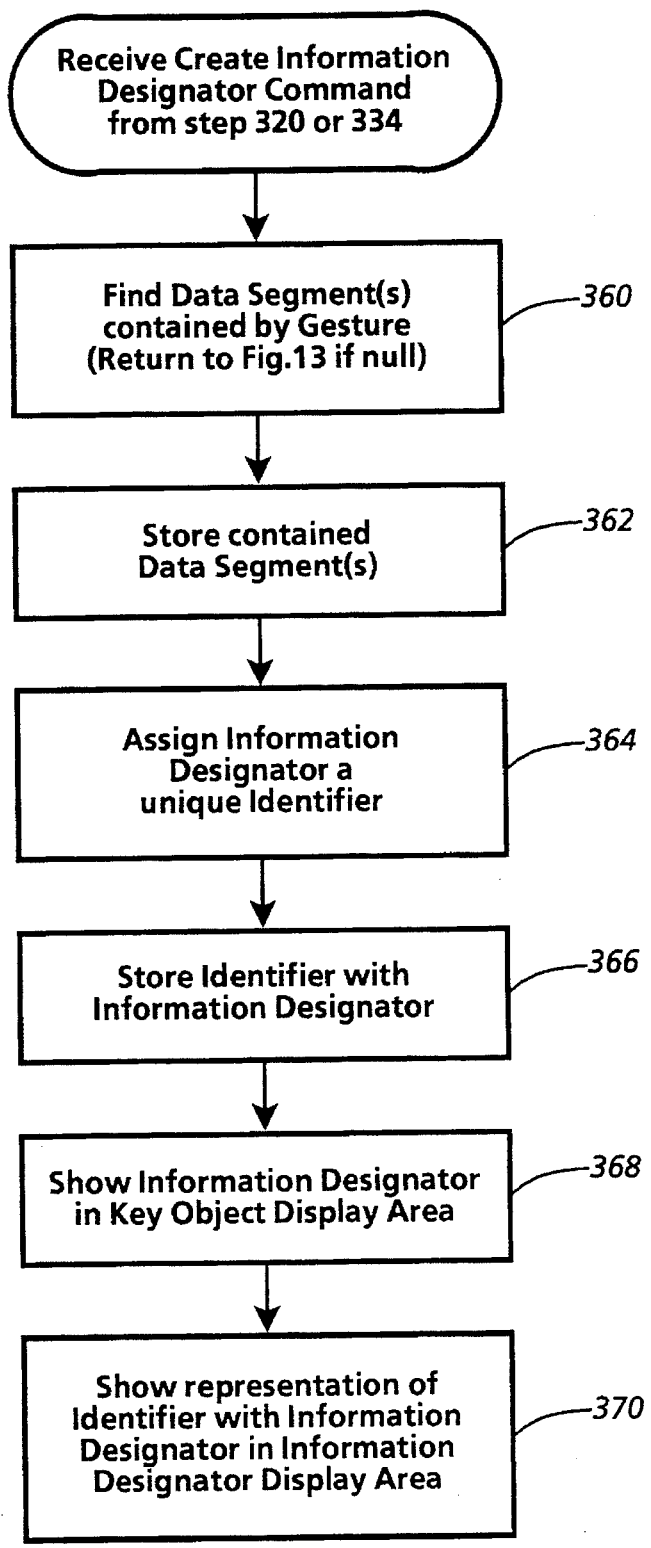
FIG. 18 describes the steps in creating a key object.

FIG. 18 describes the method of creating an information designator, as described in steps 320 or 324. The step in box 360 finds the data segment or segments contained by the gesture. As described above, in the current embodiment the create-information designator gesture is a circle. In this embodiment, step 360 finds strokes that occur within the area of that circle. In the address zone area, a stroke is considered "within" the circle if at least seventy percent of the stroke is within the area of the circle. In the information designator area, where it is more likely that a stroke is intended to be part of an information designator, at least fifty percent of the stroke must be within the circle. This identification of strokes is accomplished by knowing the area covered by the circle; this accomplished in the Macintosh IIfx system described herein by using a software library routine known as PtInRgn(), which determines if any particular pixel is inside a region. Then each stroke in the current address zone, and adjoining address zones, is searched for strokes made up of pixel positions which fall within that area.

The step in box 360 might also be defined to merely retrieve the bitmap representing the strokes in the designated area, or in some other way that captures an information designator representation of visual significance.

The step in box 363 stores the data segments, or strokes, in an information designator data structure. Then, in the step in box 364, the information designator is assigned a unique, computationally recognizable identifier. This identifier is stored with the information designator in the information designator data structure in the step in box 366. If desired, the information designator visual representation may be displayed in an information designator display area in the step in box 368. The step in box 370 then generates a visual representation of the identifier, and displays it with the information designator in the information designator display area. The position of the information designator is also stored in the information designator data structure.

Figure 19:
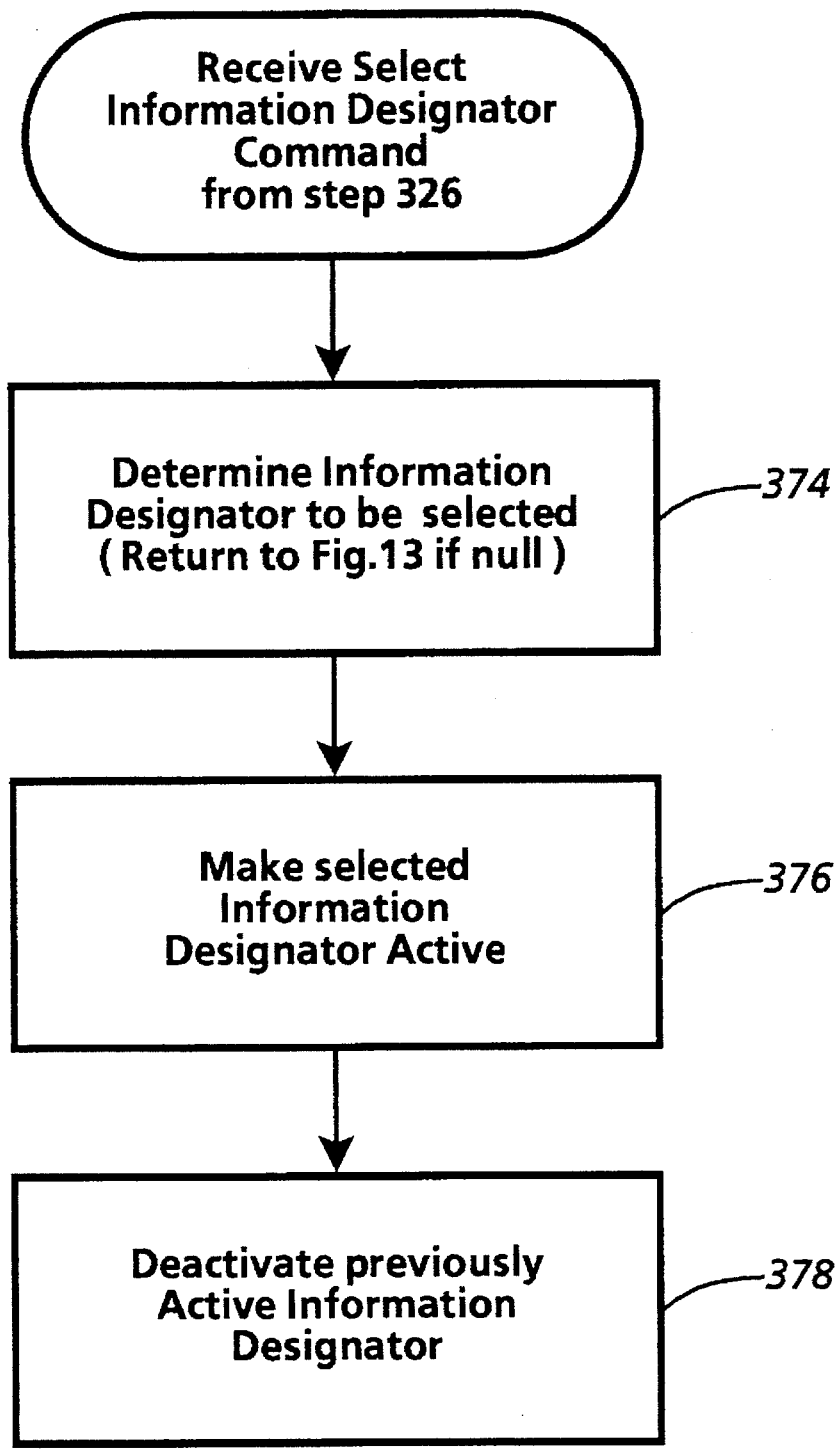
FIG. 19 describes the steps in selecting a key object.

FIG. 19 describes the method performed when an information designator select command is received in the step in box 326. The step in box 374 determines which information designator is to be selected. This is accomplished by finding the position coordinates of the first pixel of the dot, and finding the information designator that lies at that position. If no information designator is found at the position of the dot, then the gesture is ignored, and the dot is turned into ink as shown in FIG. 13. Generally, in addition to those steps described in relation to FIG. 18, the information designator will also be made the "selected," or "active," information designator when it is created, and any previously active information designator will be deactivated.

The step in box 376 makes the selected information designator the active object, and the step in box 378 makes the previously active information designator inactive. In the case of the first information designator, there will be no previously active information designators to deactivate.

Figure 20:
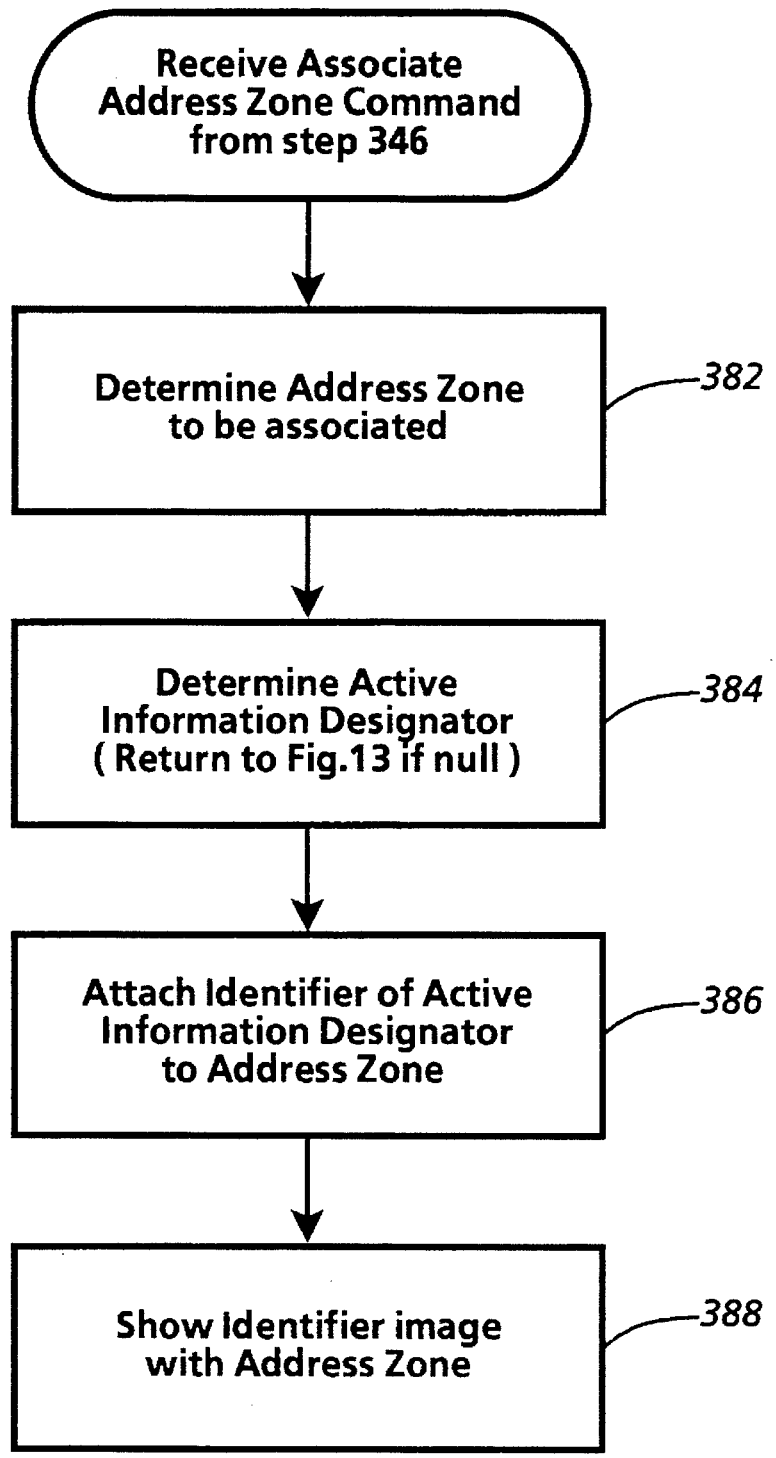
FIG. 20 describes the steps in attaching a key object to a data object.

FIG. 20 describes the method of the embodiment for associating the information designator to other data objects, also known as striping. It is so called because a "stripe" with the information designator identifier image appears in the striping area 126 alongside the attached address zone 118, providing a visual representation of the association indicative of the computational association assembled in the data structure. The step in box 382 determines which address zone data object is to be associated with the information designator. This is accomplished by determining which striping display zone the command originated in. The step in box 384 determines which information designator is selected as the active information designator. If there have been no information designators created, the system ignores the gestures, and returns to FIG. 13. Because the attach command is given in the striping area 126, no inked strokes are allowed.

The step in box 386 attaches the identifier of the active information designator to the selected address zone data object. This is accomplished by putting the identifier into the data structure associated with that data object. Each address zone data object may have a number of associated information designators.

In the step in box 388, the visual image of the identifier is shown alongside the address zone it has been attached to. This allows a user to visually determine which address zones are associated with any information designator. In the present embodiment, when an information designator identifier appears in at least two adjacent address zones, the stripe representing that information designator will be placed so that it is continuous across address zone boundaries, further aiding the user in determining information designator relationships.

Figure 21:
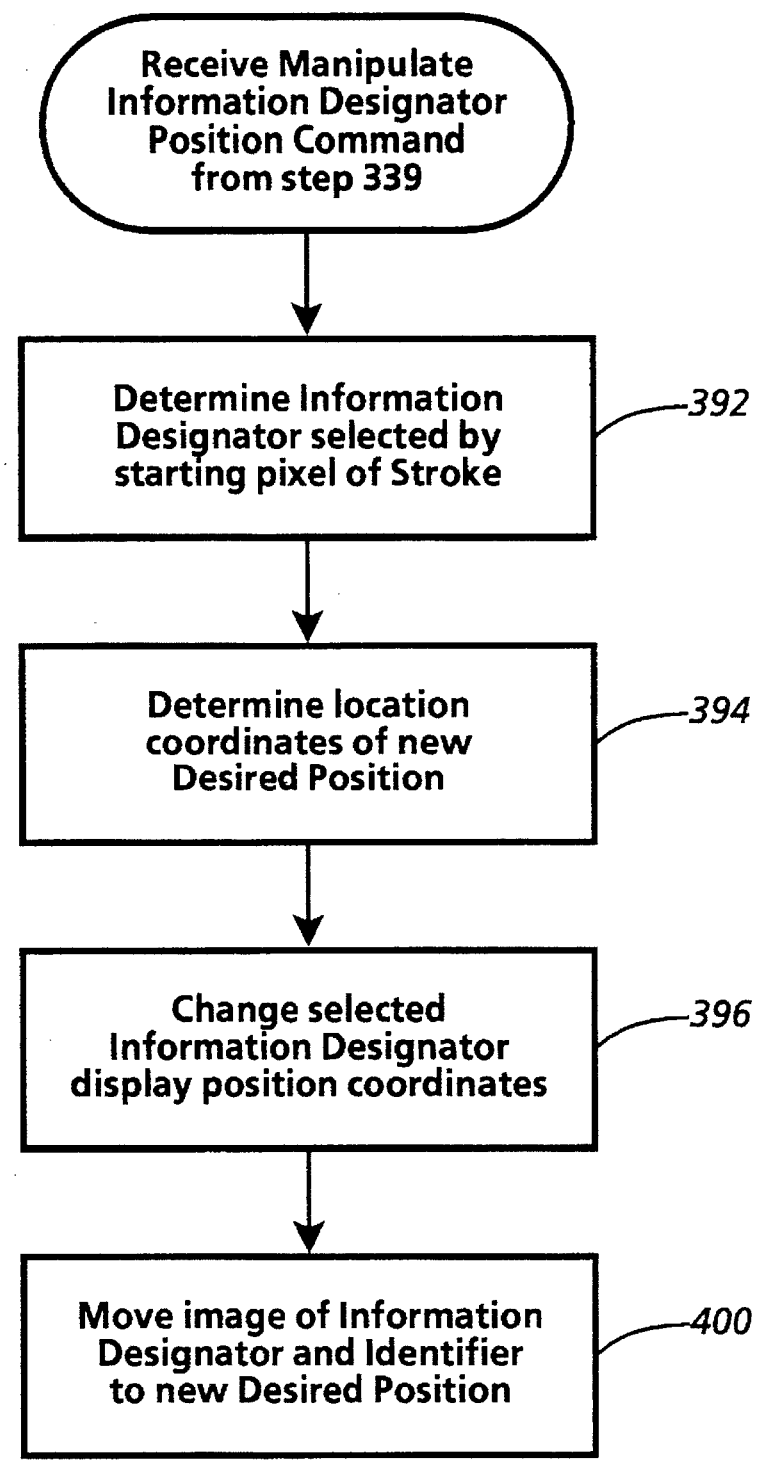
FIG. 21 describes the step in manipulating the position of a key object.

FIG. 21 describes a method of manipulating the position of the information designator in the information designator display area, as described in step 339. The step in box 392 determines in which information designator the stroke begins. This determines which information designator is to be moved.

The location coordinates of the new desired position are determined from the last pixel of the gesture in the step in box 394. The display position coordinates of the selected information designator are then changed to reflect this new desired position in the step in box 396. The step in box 400 actually moves the image of the information designator from its previous position to the new position.

Figure 22:
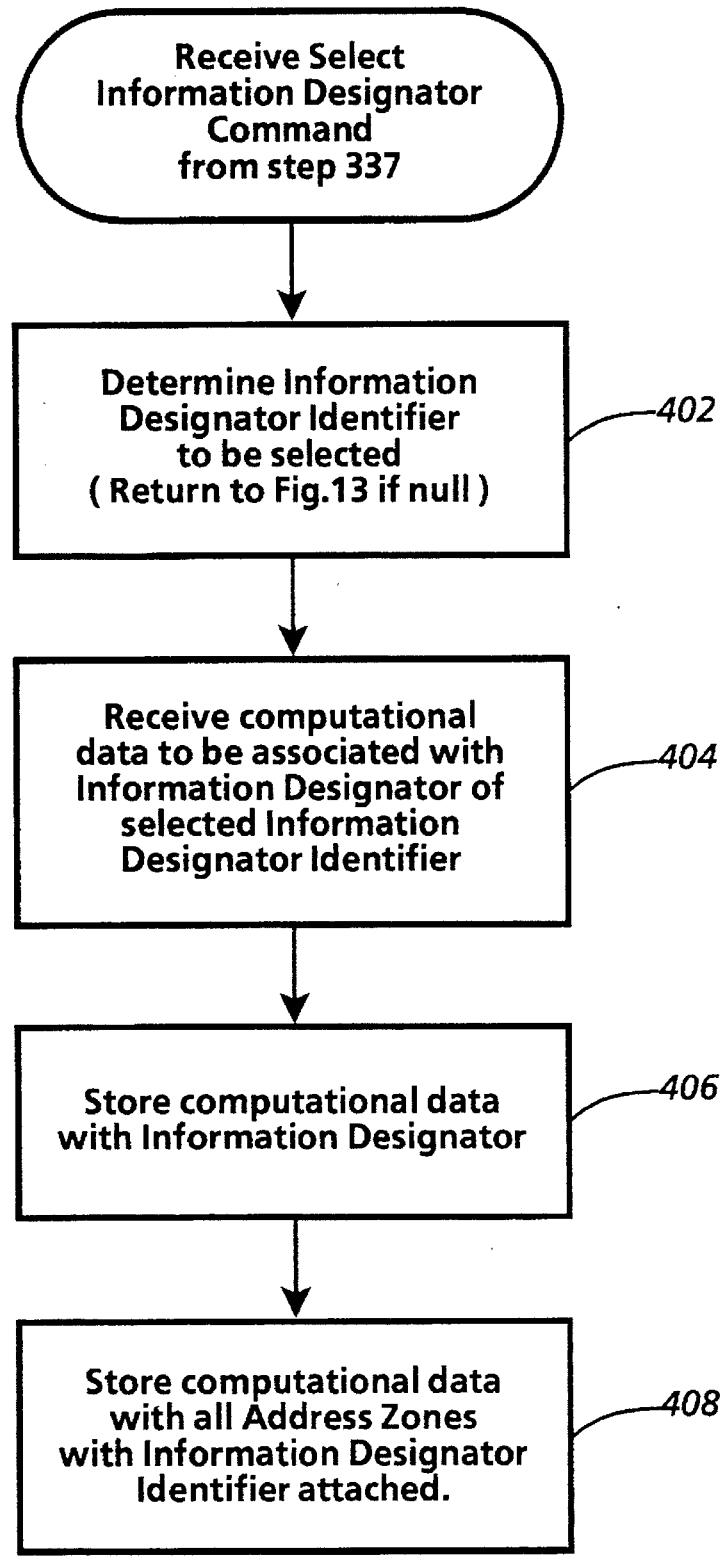
FIG. 22 describes the steps in selecting a key object identifier to add computational data to be associated with a key object.

FIG. 22 describes a command for providing the information designator with a textual description by selecting the information designator identifier, as described in step 337. This is commonly done in a post-processing mode, and allows the user to go back and establish textual names for categories indicated by the information designators.

The step in box 402 determines which information designator identifier has been selected. As described above, as mini-circle is the gesture for this command. If an information designator identifier is not found in the area of the mini-circle, the gesture is ignored. Returning to FIG. 13, the stroke is "inked" if in the information designator display area, but not "inked" if it is in the striping display area.

The step in 404 receives the data to be associated with the information designator identifier. For example, text may be entered for an information designator consisting of a word that was written, but not recognized, by the pen in the pen input system. In the step in box 406, this data is stored with the information designator, and in the step in box 408, it is also stored with each data object that is associated with the information designator by the information designator identifier.

3. Data Structure Description a. The Address Zone Data Structure

The address zone data structure and the information designator data structure employed by the method of the present invention are "model data structures" from which are produced all or a portion of the images with which the system user interacts. A model data structure is a combination of interrelated data items, at least some of which are "model data items". A model data item is contrasted with a data item containing image definition data defining an image, such as a "pixel data item". As will be apparent from the description below, the address zone data structure may contain data items containing image definition data defining an image, but cannot be entirely comprised of data items containing image definition data. A model data structure is not necessarily limited to a combination of data items physically located in a substantially contiguous part of a system's memory, but may include individual model data items diversely located in memory and accessible by the processor when it performs the operation.

In the illustrated embodiment, the address zone data structure and the information designator data structure are collections, or lists, of individual address zone data structures, and information designator data structures, respectively, describing "objects". An "object" typically represents a semantic aspect of an application domain (e.g., letters, words, and paragraphs in a word processor; graphical display features in a drawing program; temporal events and dependencies in a project management system; etc.). Object-based models permit several types of operations to be performed by a system user on the objects in the model that are represented as display features or display objects in images. For example, new objects can be added to the model data structure based on signals, actions, or gestures made by the system user, and these new objects will be presented for display at a designated spatial location when the image is produced; an object can be deleted from the model data structure by deleting its display object representation from the image; and an object can have any one of its properties changed by arbitrary computations. The image produced from such a model data structure may show an object overlapping spatially with another object. For model data structures operated on by an application which presents an editable image, an object can be moved to a new position in space, and the model data structure changed accordingly to have information correctly indicating the new position.

Where an application provides for receiving input for performing editing operations, a user may manipulate objects in an image, and the user's input signals, converted to display position information, can be mapped to specific objects in the model data structure in order to allow the user to edit or otherwise manipulate the object-based model data structure. Typically also, each object, along with its properties, is uniquely addressable by a pointer or identifier, and thus objects can refer to each other in their descriptions. Objects or their properties may also describe relations or constraints between other objects.

In one type of object-based model, the object data item descriptions fully describe how objects are to be spatially presented with respect to each other in an image. Such an object-based model data structure is rendered into either a graphics or procedural model data structure, such as the PostScript® page description language, or directly into an image definition data structure (such as a pixel array) in order to guide the display hardware and software to display the objects on the display. PostScript® is a trademark of Adobe Systems. Other types of object-based models do not include data that fully describe how objects are to be spatially presented with respect to each other in an image, and an application that operates on such object-based models must include instructions for laying out the objects in an image. Typically, the application uses some form of object identification data in the model to determine where an object is to be positioned in the image, effectively linking the object to its position. The system and method of the present invention may employ object-based model data structures created by any manner most suitable for achieving processing efficiencies or other system goals.

Figure 23:
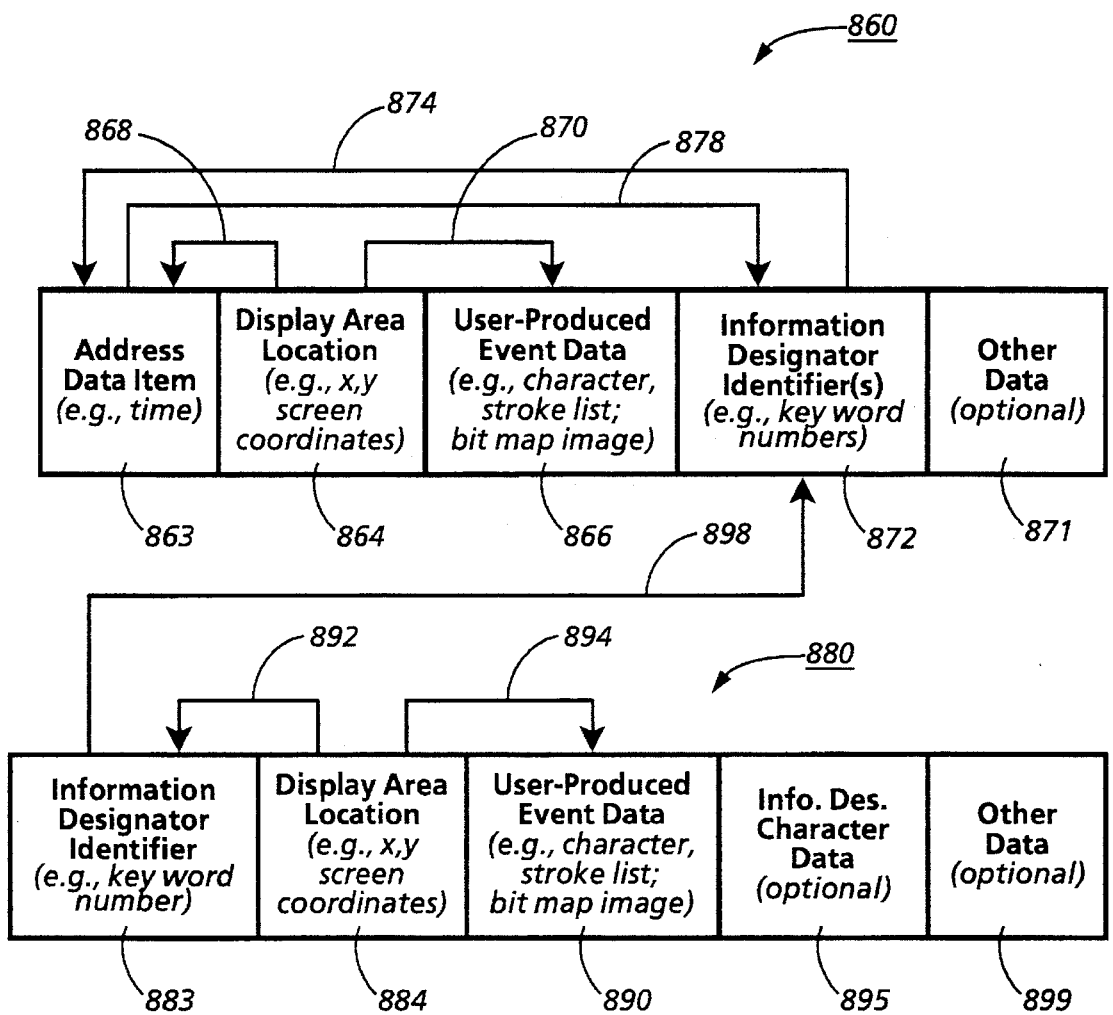
FIG. 23 is a schematic diagram of the organization of the data structures and their interconnections used in the illustrated embodiment of the invention.

The system and method of the present invention, however, need not be implemented with object-based model data structures as shown and described herein, and will operate as described when non-object-based data structures are organized to support the connections between the data items as described below. Connecting lines and arrows in FIG. 23 illustrate the concept that a first data item indicates a second data item. As noted earlier, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. The connection between the data items may be implemented using pointers or other linking mechanisms, or by defining the data structures in memory to the method, or in any other manner that accomplishes this connection.

Another variation in the implementation of the system and method of the present invention that affects the data structure organization is the type of user input device that is used. In the illustrated embodiment, the system user uses a stylus device to enter data in the form of strokes on a tablet-like display. In the illustrated embodiment, these strokes, which are pixel data items, are not operated on for recognition purposes and conversion to model data items. The data structures used in the illustrated embodiment are organized for accommodating the storage of strokes as user-produced event data. These data structures are shown in FIG. 23.

With reference now to FIG. 23, an address zone data structure 860 is created every time the system receives signals requesting the creation of a address zone. In response to those signals, the data value obtained from the address source is stored in address data item 863, and the address marking location of the beginning of the spatial region is stored in display location area data item 864. In the case of the notetaking system described above, address zones may be referred to as "time zones," the address source producing time values. The address marking location may either be determined by the system, for example, when the system controls the placement of the spatial regions in display area 110, or it may be determined from the user's request signals, as, for example, from the beginning of the position of the stylus device in the display area when the user makes the request to create an address zone. The address marking location marks the beginning of a spatial region in the display area. Thus, address zone data structure 860 can be said to be "represented by" spatial region 118 in display area 110. In the illustrated embodiment, the ending of a spatial region is determined by the beginning of the next spatial region, and no ending location need be stored in address zone data structure 860, but an ending location may be computed and stored in address zone data structure 860 for efficiency purposes. The address marking location may either be an absolute location in the display area, or established as an offset from a starting display location, as, for example, when a window system is used, and the address zones are displayed in a workspace, or window in the display area. The display location area data item 864 indicates address data item 863, as shown schematically in FIG. 23 by line and arrow 868.

In response to the signals entering user-produced event data, or inked strokes as described above in relation to FIG. 13, the following processes are performed in order to store the user-produced event data in address zone data structure 860. The spatial region location of the user-produced event data entered in the display area is used to obtain the address zone data structure 860 corresponding to, or represented by, the spatial region in the display area. The display coordinates of the beginning position of the user-produced event data are used to search all address zone data structures for the proper corresponding data structure using the address marking location as a beginning comparison location. Once obtained, the user-produced event data is stored in data item 866. The user-produced event data may be stored in the form of strokes, or as a bitmap image. The display location area data item 864 indicates data item 866, as shown schematically by line and arrow 870. In the illustrated embodiment, each pixel location in the user-produced event data displayed in a particular spatial region is stored in data item 866, and so every stroke is retrievable from data item 866 by knowing its display area location.

b. Creating an Information Designator and Associating it With an Address Zone

In a meeting scenario, suppose that the system user taking notes realizes that some portion of the substance of the meeting is relating to the subject of "handwriting." The system user may designate some previously entered user-produced event data as an information designator for the purpose of tracking that data through the course of the event, or for correlating that data to the address value of a spatial region. In FIG. 18, there is described the creation of an information designator, or key object, and in FIG. 20 there is described how an information designator may be associated with an address zone. In FIG. 18, the processor receives a signal from the system user designating display features in the display area representing user-produced event data as an information designator. The signal includes the display location of the user-produced event data. In response, an information designator data structure is created and the data is store in it in box 362. Processing related to the information designator data structure is described in more detail below.

Figure 4:
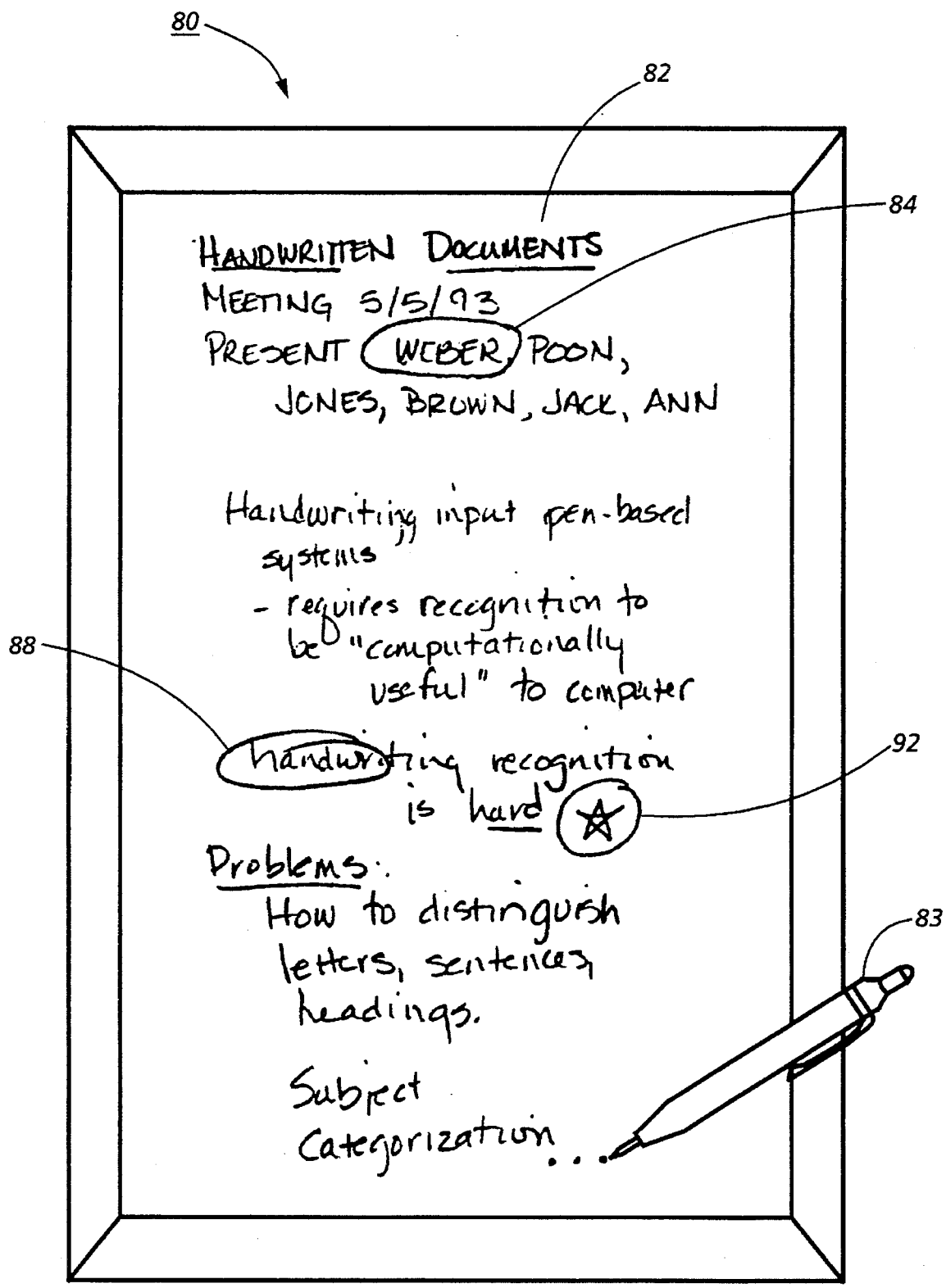
FIG. 4 shows a general purpose pen-based computer device including a handwritten image.
Figure 6:
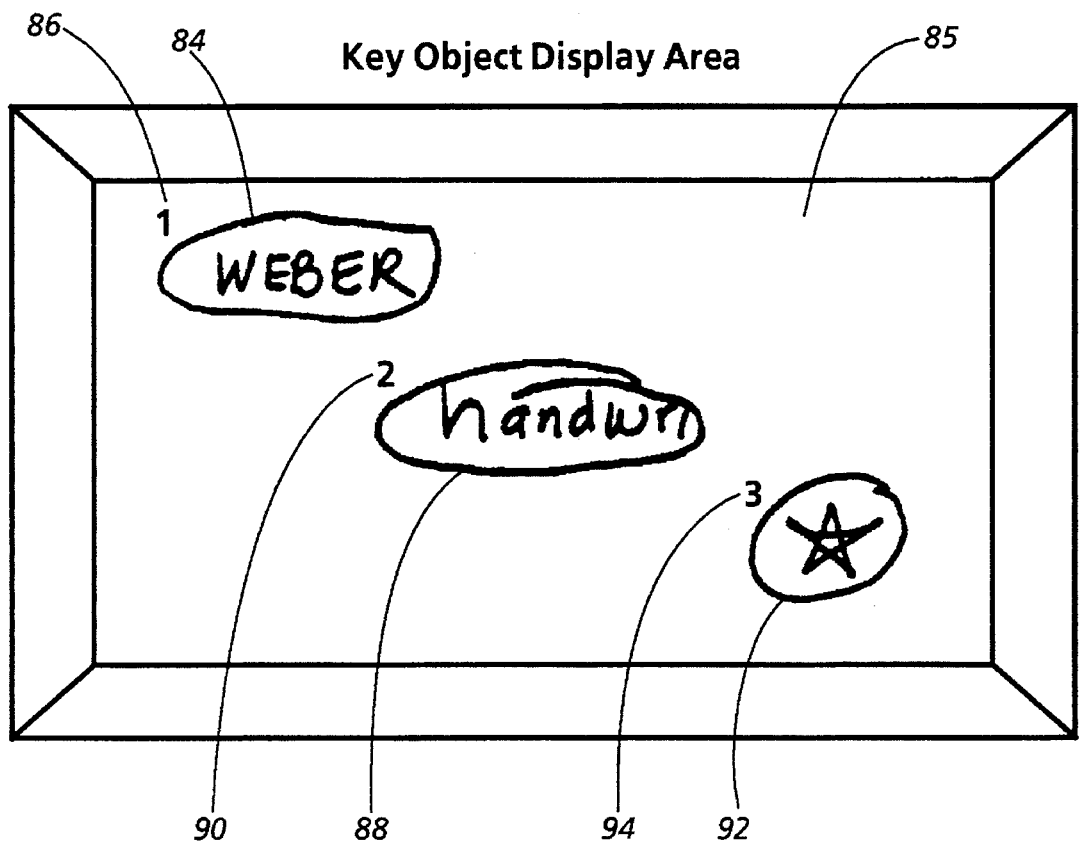
FIG. 6 shows an example of a key object display area or palette.

Further in response to the command to create an information designator, an image is displayed in the display area that includes an information designator display object representing the information designator. FIG. 7 illustrates the display of an image showing a designator display object 84 representing an information designator. When the system user uses a stylus input device, an information designator may be designated using a stroke interpreted as an enclosure gesture. FIG. 4 shows designator display object 84 as the image of the word "WEBER" enclosed in a stroke, and displayed in spatial region 82. The designator display object 84 representing the information designator may be displayed in an address zone region, or the information designator may be displayed in a distinct region of the display area 88 reserved for information designators, shown in FIG. 6, as was described in the description of the user interface for the present embodiment.

The system user may associate, or "attach", the information designator represented by designator display object 84 to any spatial region in display area 106 by selecting the designator display object 84 representing an information designator and indicating a target spatial region location. In FIG. 20, these selection and target spatial region location signals are received in box 384. Then, image definition data defining an image showing the results of associating an information designator with a spatial region is produced and displayed in box 388. There are several alternative ways, described below, of showing to the system user that an information designator is associated with a particular spatial region or portion of data.

c. The Information Designator Data Structure

Figure 24:
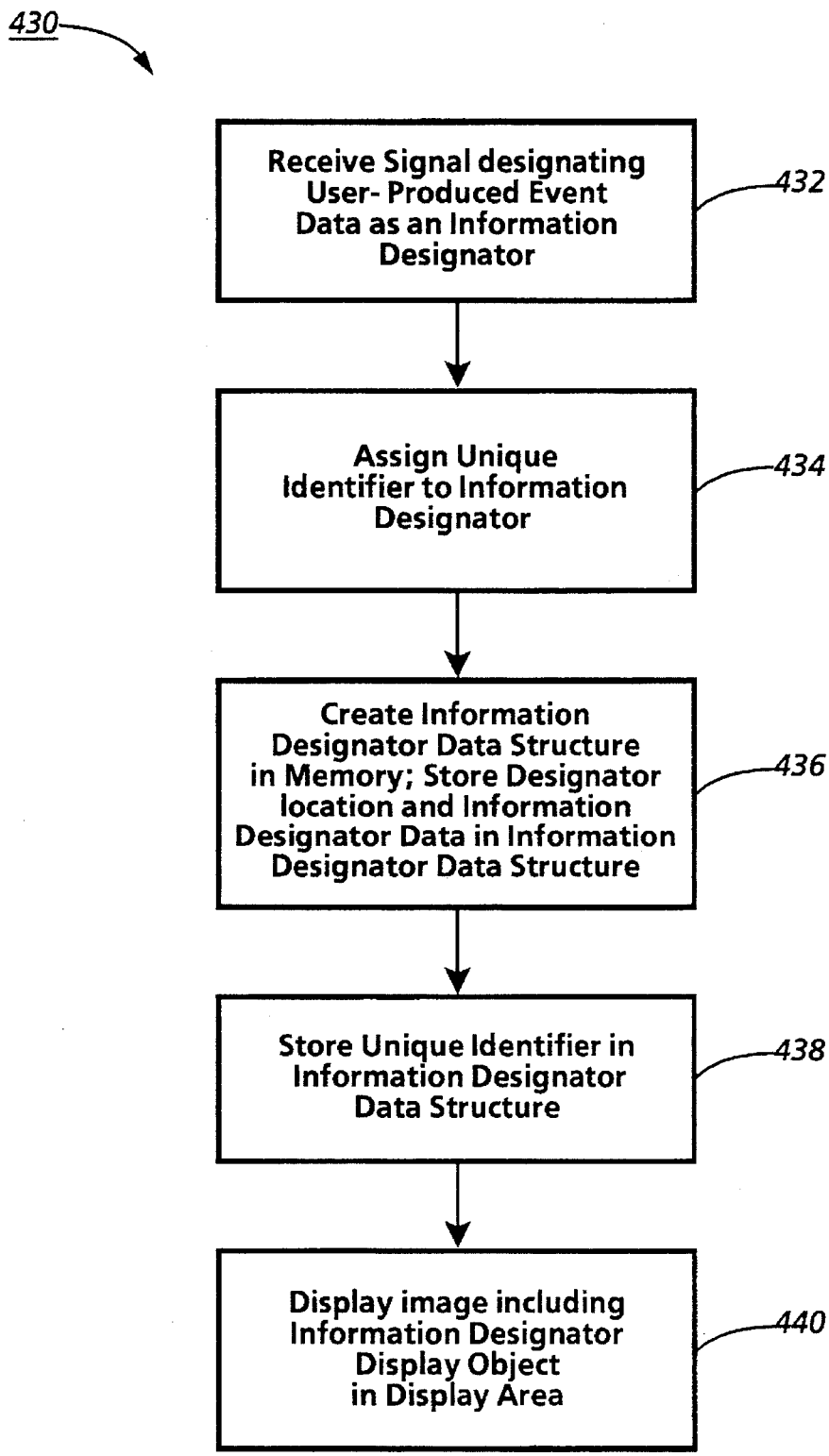
FIG. 24 describes the creation of an information designator in the data structures according to the method of the present invention.

In response to the signal received in box 430 of FIG. 24, an information designator data structure, or object, is created, in box 434, for each user-produced event data designated as an information designator. Information designator data structure 880 is shown in FIG. 23. A unique information designator identifier, hereafter called a "unique identifier," is assigned to the information designator, in box 434. A unique identifier is assigned so that the information designator may be accessed and manipulated computationally without having to recognize the strokes comprising the user-produced event data. In the illustrated embodiment, ordinal numbers are used as unique identifiers. In box 436 the user-produced event data designated as the information identifier is stored in data item 890. This user-produced event data is obtained from the address zone data structure using the display area location of the user-produced event data to first identify the proper corresponding address zone data structure, and then to search data item 866 for the selected strokes designated as the information designator.

Also in box 436, a designator location is determined for the information designator and stored in display location area data item 884. The designator location is determined by the system and indicates the location in display area 110 where the information designator is displayed. If the information designator is to remain displayed in the spatial region in which it was originally created, the designator location is a location in the spatial region. Alternatively, the information designator may be displayed in a separate information designator region, distinct from the display of the spatial regions, and a designator location for the information designator is selected by the method and stored in display location area data item 884. If a distinct information designator region is used, information designators may also be created in that region. As with the address marking location of a spatial region, the designator location is typically established as an offset from a starting display location in the display region. The designator location stored in display area location data item 883 indicates the unique identifier stored in data item 883, as shown schematically in FIG. 23 by line and arrow 892. Display area location data item 883 also indicates the user-produced event data designated as the information designator stored in data item 890.

Next, the unique identifier is stored in data item 883, in box 438 of FIG. 24, and, again, this step is not performed if the user-produced event data may be used directly as the information designator; arrow 437 shows that processing in box 438 may be optionally omitted.

Figure 25:
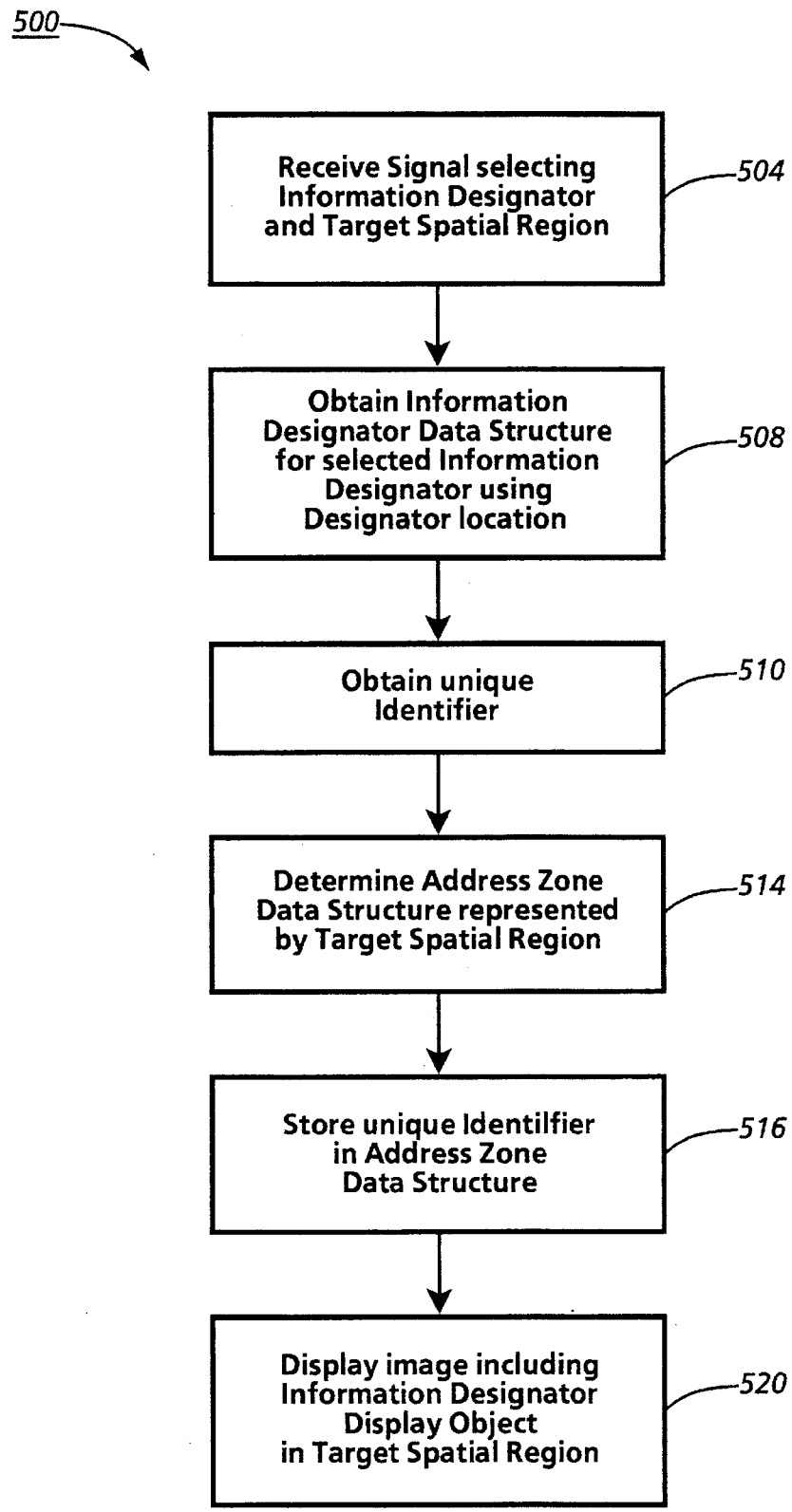
FIG. 25 describes associating an information designator with an address zone in the data structures according to the method of the present invention.

In the illustrated embodiment, when an information designator is created using user-produced event data previously entered in an address zone, designation of the user-produced event data designated as the information designator also results in associating the information designator with the address zone in which it was created. This involves the additional process, shown in FIG. 25 as box 516, of storing the unique identifier in the address zone data structure 860, in information designator data item 872. In addition, the unique identifier in information designator data structure 880 indicates the unique identifier in the address zone data structure 860, as shown schematically in FIG. 23 by line and arrow 898. When a unique identifier is used to identify an information designator, a representative image may be displayed in the spatial region to which the information designator is attached, as shown in FIG. 7, with the display image of unique identifier 84 shown as ordinal number "1", in spatial region 88.

Returning now to FIG. 25, in response to the signals from the system user selecting an information designator and a target spatial region to which the system user wants to attach the information designator, boxes 508 through 516 illustrate the processes performed in order to accomplish this. The selection signal received from the user is a user action selecting the display object representing the selected information designator and includes the designator location of the selected information designator in the display area. For purposes of display, the user may provide an actual location in the target spatial region at which the designator display object representing an information designator is to be displayed, or simply indicate a target spatial region, in which case the spatial region location in which to present the designator display object representing the information designator is determined.

In box 508, the designator location of the selected information designator is used to obtain the information designator data structure 880 represented by the selected information designator. Then the unique identifier is obtained from the information designator data structure, in box 510.

Next, in box 514, the target spatial region location of the target spatial region is used to obtain the address zone data structure 860 corresponding to, or represented by, the target spatial region in the display area. The display coordinates of the target spatial region location are used to search all address zone data structures for the proper corresponding data structure using the address marking location as a beginning comparison location. Once obtained, the unique identifier is stored in the address zone data structure 860, in information designator data item 872, in box 516. In addition, the unique identifier in information designator data structure 880 indicates the unique identifier in the address zone data structure 860, as shown schematically in FIG. 23 by line and arrow 898.

D. Miscellaneous

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed is:

1. An interactive method for operating a processor-controlled system to modify a correlation between two data structures using a table image; the processor-controlled system including input circuitry connected to a user input device for producing graphical signals including strokes indicating actions of a system user; output circuitry connected to at least one display having at least one display area for presenting images; memory for storing data; a processor connected for receiving the graphical signals from the input circuitry connected for providing images to the output circuitry, and connected for accessing the data stored in the memory: the data stored in the memory including instruction data indicating instructions the processor executes; the method comprising:

operating the processor to obtain key object data items from a first data structure stored in the memory, and to obtain information data items from a second data structure stored in the memory; at least one of the information data items being associated with at least one respective key object data item such that the information data item is retrievable using the respective key object data item;

operating the processor to present a table image in the display area using the key object data items and the information data items; the table image including a plurality of first dimension identifier regions, a plurality of second dimension identifier regions, and a plurality of cell regions; the table image showing a key object image in each of the first dimension identifier regions; each key object image representing one of the key object data items included in the first data structure; the table image further showing an information image in each of the second dimension identifier regions; each information image representing one of the information data items included in the second data structure; the table image further showing, in each cell region at the intersection of a first dimension identifier region and a second dimension identifier region, display features indicating whether the respective key object data item represented by the key object image and the information data item represented by the information image have an associative relationship indicated in the first and second data structures; the table image presenting a grid of key object data items by information data items and a graphical display of associative data structure relationships therebetween;

operating the processor to receive a first signal from the user input device indicating a selection action of one of the plurality of cell regions as a selected cell region in the table image; the first signal further including a modification signal indicating a request to modify an associative relationship between a respective key object data item in the first data structure and an information data item in the second data structure represented by the selected cell region;

operating the processor to respond to the first signal by:

modifying the first or second data structure to indicate a modified associative relationship therebetween using the key object data item and the information data item represented by the selected cell region; and presenting an image in the selected cell region including display features showing the modified associative relationship between the key object data item and the information data item represented by the selected cell region.

2. The interactive method of claim 1 for operating a processor-controlled system to modify a correlation between two data structures wherein the key object data items included in the first data structure and the information data items included in the second data structure each indicate non-machine-recognizable data; the non-machine-recognizable data indicated by an information data item being retrievable using the non-machine-recognizable data indicated by a respective one of the key object data items; the system user being able to modify associative relationships established between non-machine-recognizable data.

3. The interactive method of claim 2 wherein the non-machine-recognizable data is stroke data.

4. The interactive method of claim 2 wherein the non-machine-recognizable data is image definition data.

5. The interactive method of claim 2 wherein the associative relationship between a first key object data item and a first information data item each indicating non-machine-recognizable data is produced using a unique key object identifier assigned to the first key object data item; the unique key object identifier being machine-recognizable data and stored in the second data structure to indicate the first information data item.

6. The interactive method of claim 1 for operating a processor-controlled system to modify a correlation between two data structures wherein the modification signal indicating a request to modify the associative relationship between the key object data item and the information data item represented by the selected cell region is a delete-association request; and wherein the step of modifying the first or second data structure to indicate a modified associative relationship includes deleting the associative relationship between the key object data item and the information data item.

7. The interactive method of claim 1 for operating a processor-controlled system to modify a correlation between two data structures wherein the modification signal indicating a request to modify the associative relationship between the key object data item and the information data item represented by the selected cell region is an add-association request; and wherein the step of modifying the first or second data structure to indicate a modified associative relationship includes producing the associative relationship between the key object data item and the information data item.

8. The interactive method of claim 1 for operating a processor-controlled system to modify a correlation between two data structures wherein the first dimension identifier region is a column region and the second dimension identifier region is a row region; the table image showing key object images in the column identifier regions, information images in the row identifier regions and display features showing associative relationships in intersecting cells; the associative relationships between a respective one of the key object images and all of the information images being visually aligned in a column in the table image so as to show patterns in the associative relationships.

* * * * *